(12) United States Patent
Okuno et al.

(10) Patent No.: US 9,910,507 B2
(45) Date of Patent: Mar. 6, 2018

(54) IMAGE DISPLAY APPARATUS AND POINTING METHOD FOR SAME

(71) Applicant: SAMSUNG ELECTRONICS CO., LTD., Suwon-si (KR)

(72) Inventors: Yoshiaki Okuno, Kanagawa (JP);
Kousuke Hirasawa, Kanagawa (JP);
Edwardo Arata Yamamoto Murakami, Kanagawa (JP); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 67 days.

(21) Appl. No.: 15/027,108

(22) PCT Filed: Oct. 1, 2014

(86) PCT No.: PCT/KR2014/009273
§ 371 (c)(1),
(2) Date: Apr. 4, 2016

(87) PCT Pub. No.: WO2015/050380
PCT Pub. Date: Apr. 9, 2015

(65) Prior Publication Data
US 2016/0239096 A1  Aug. 18, 2016

(30) Foreign Application Priority Data

Oct. 2, 2013 (JP) .................................. 2013-207599
Oct. 25, 2013 (JP) .................................. 2013-222280
(Continued)

(51) Int. Cl.
*G06F 3/01* (2006.01)
*G06F 3/03* (2006.01)
(Continued)

(52) U.S. Cl.
CPC .............. *G06F 3/017* (2013.01); *G06F 3/033* (2013.01); *G06F 3/0325* (2013.01);
(Continued)

(58) Field of Classification Search
CPC ........ G06F 3/017; G06F 3/033; G06F 3/0325; H04N 5/4402; H04N 21/42222
See application file for complete search history.

(56) References Cited

U.S. PATENT DOCUMENTS 7,102,616 B1    9/2006  Sleator
8,552,978 B2 *  10/2013  Ye .......................... G06F 3/0346
                                                        178/18.01
(Continued)

FOREIGN PATENT DOCUMENTS

EP    0736837 A2   10/1996
EP    1082696 A1   10/2000
(Continued)

OTHER PUBLICATIONS

International Search Report for PCT/KR2014/009273 dated Jan. 12, 2015 [PCT/ISA/210].
(Continued)

*Primary Examiner* — Patrick F Marinelli
(74) *Attorney, Agent, or Firm* — Sughrue Mion, PLLC

(57) ABSTRACT

An image display apparatus that automatically adjust a pointing direction of a remote controller to almost match with a position of a pointer on a screen, and a pointing method performed by the image display apparatus are provided. The image display apparatus includes a reference angle detector configured to detect a reference angle formed by the pointing direction of the remote controller with respect to a reference direction set for a display; a remote control direction detector configured to detect a remote control direction which is a direction in which the remote
(Continued)

controller is viewed, from a reference point set on the display; and a standard direction adjuster configured to adjust a standard direction set in the remote controller so that the standard direction reaches the reference point on the display as viewed from the remote controller, based on the reference angle and the remote control direction.

16 Claims, 34 Drawing Sheets

(30) Foreign Application Priority Data

| | | |
|---|---|---|
| Nov. 25, 2013 | (JP) | 2013-242589 |
| Aug. 27, 2014 | (JP) | 2014-173247 |
| Oct. 1, 2014 | (KR) | 10-2014-0132316 |

(51) Int. Cl.
　　*G06F 3/033* (2013.01)
　　*H04N 21/422* (2011.01)
　　*H04N 5/44* (2011.01)
　　*H04N 21/442* (2011.01)

(52) U.S. Cl.
　　CPC ..... *H04N 5/4403* (2013.01); *H04N 21/42222* (2013.01); *H04N 21/44218* (2013.01)

(56) References Cited

U.S. PATENT DOCUMENTS

| | | |
|---|---|---|
| 9,298,282 B2 | 3/2016 | Liberty |
| 2005/0253806 A1 | 11/2005 | Liberty et al. |
| 2006/0114119 A1 | 6/2006 | Matsumura et al. |
| 2008/0174551 A1 | 7/2008 | Ishibashi |
| 2009/0295721 A1 | 12/2009 | Yamamoto et al. |
| 2009/0322676 A1 | 12/2009 | Kerr et al. |
| 2011/0260968 A1* | 10/2011 | Ye .......... G06F 3/0346 345/158 |
| 2012/0131518 A1 | 5/2012 | Lee et al. |
| 2012/0214588 A1* | 8/2012 | You ......... H04N 9/3173 463/31 |
| 2013/0002549 A1* | 1/2013 | Chen ......... G06F 3/0304 345/158 |
| 2013/0093675 A1* | 4/2013 | Lin .......... G06F 3/033 345/158 |
| 2016/0239096 A1* | 8/2016 | Okuno ........ G06F 3/033 |

FOREIGN PATENT DOCUMENTS

| | | |
|---|---|---|
| JP | 2002-62981 A | 2/2002 |
| JP | 2006-155345 A | 6/2006 |
| JP | 2007-66080 A | 3/2007 |
| JP | 2007-509448 A | 4/2007 |
| JP | 4043702 A | 2/2008 |
| JP | 2008-181198 A | 8/2008 |
| JP | 2008-227605 A | 9/2008 |
| JP | 2011-170401 A | 9/2011 |
| KR | 10-2011-0099461 A | 9/2011 |
| KR | 10-2012-0037278 A | 4/2012 |
| KR | 10-2012-0055434 A | 5/2012 |
| KR | 10-2012-0126508 A | 11/2012 |

OTHER PUBLICATIONS

Written Opinion for PCT/KR2014/009273 dated Jan. 12, 2015 [PCT/ISA/237].

Communication dated Mar. 8, 2017, issued by the European Patent Office in counterpart European Patent Application No. 14850816.1.

* cited by examiner

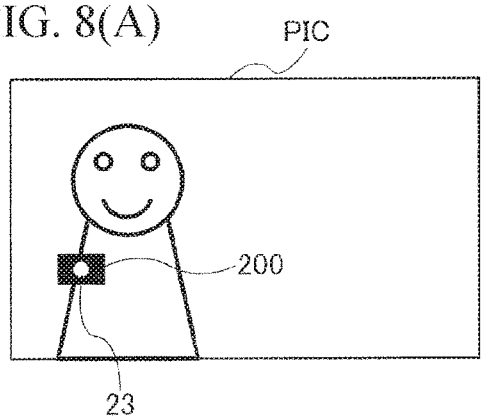
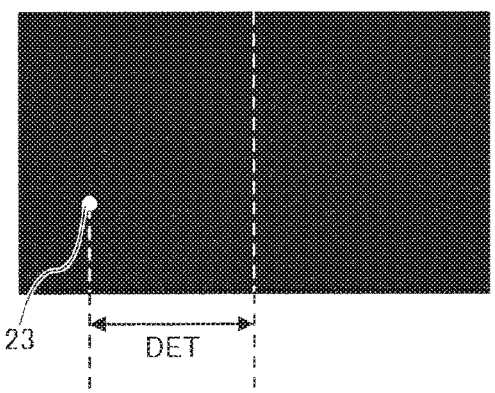
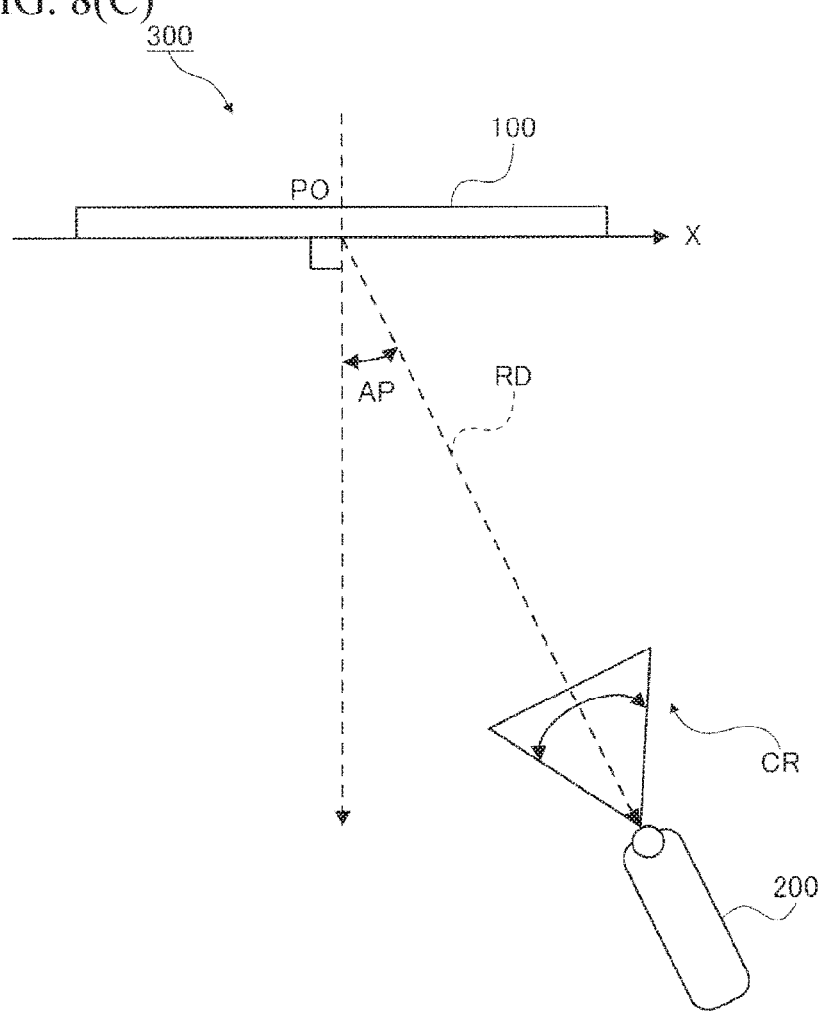

REMOTE CONTROLLER

REMOTE CONTROLLER

IMAGE CAPTURED WHEN REMOTE CONTROLLER
POINTS TO EACH AREA

IMAGE DISPLAY APPARATUS AND POINTING METHOD FOR SAME

CROSS-REFERENCE TO RELATED APPLICATIONS

This is a National Stage Entry of International Application No. PCT/KR2014/009273 filed Oct. 1, 2014, claiming priority based on Japanese Patent Application No. 2013-207599 filed Oct. 2, 2013, No. 2013-222280 filed Oct. 25, 2013, No. 2013-242589 filed Nov. 25, 2013, No. 2014-173247 filed Aug. 27, 2014, and Korean Patent Application No. 10-2014-0132316 filed Oct. 1, 2014, the contents of all of which are incorporated herein by reference in their entirety.

BACKGROUND

1. Field

The present invention relates to an image display apparatus that controls a pointer to be displayed on a display, and a pointing method performed by the image display apparatus.

2. Description of Related Art

If a website is browsed via a TV, a TV remote controller including a pointing function may be used to click a link or the like.

This remote controller includes a motion sensor such as an acceleration sensor or an angular velocity sensor, and is configured to detect a posture angle variation of the remote controller from outputs of these sensors and convert a pointing angle calculated from the detected posture angle variation into a pointer position on a display (see Patent Document 1). This case is referred to as a relative pointing method, because the pointer position on the display is accumulatively calculated based on the posture angle variation of the remote controller.

However, in pointing devices using the relative pointing method, a direction in which a remote controller points may be largely different from a pointer position on a display, and thus users may fail to have natural usage feeling. This phenomenon occurs due to a change in a relationship between relative positions of the display and the remote controller or accumulation of posture errors of the remote controller that are estimated by a motion sensor.

A conventional pointing device will now be illustrated and described in detail. As shown in FIG. 35, a remote controller 200 including an angular velocity sensor and operating based on a relative pointing method horizontally moves a pointer position on a screen by horizontally changing a pointing direction PD, in which a leading end of the remote controller 200 points.

In more detail, a standard direction SD is set in the remote controller 200, and a pointer position on a display 100 is determined according to a pointing angle formed by the pointing direction PD with respect to the standard direction SD.

A manipulating angle range CR is set as a predetermined solid angle having the standard direction SD as its center according to a predetermined correspondence relationship with a pointing range on the display 100 of FIG. 35. For example, when the manipulating angle range CR is set to be narrow, a pointer is sensitive to a motion of the remote controller 200, and, when the manipulating angle range CR is set to be wide, the pointer is dull to a motion of the remote controller 200.

In other words, when the standard direction SD matches the pointing direction PD, the pointer is disposed on the center of a screen of the display 100. When a pointing angle exists, a pointer position on the display 100 is changed according to the set manipulating angle range CR.

In FIG. 35, P1 indicates a case where the remote controller 200 is located in the front direction of the display 100. In this case, the standard direction SD, which is the center of the manipulating angle range CR, perpendicularly faces a screen center PO. When the standard direction SD matches a direction perpendicular to the screen center P, the pointing direction PD of the remote controller 200 favorably matches the pointer position, and thus users may have a natural usage feeling.

When a user has moved rightwards according to setting of P1 of FIG. 35, as shown in P2 of FIG. 35, the standard direction SD faces a right end of the display 100. When the pointing direction PD of the remote controller 200 also faces the right end of the display 100 so as to match the standard direction SD as indicated by P2 of FIG. 35, the pointer is not displayed on the right end of the screen but on the screen center according to the setting of P1 of FIG. 35. As such, the pointing direction PD of the remote controller 200 greatly mismatches with the pointer position, and thus users feel it is unnatural.

When this mismatch occurs, a conventional pointing device compulsorily makes the pointing direction of the remote controller match with the pointer position through a user directing the remote controller toward the screen center and then pressing a reset button. Alternatively, there is a pointing device configured such that a pointer stops when moving to an end of a display, and that a user is able to adjust a pointing direction of a remote controller to match with a pointer position on a screen end.

There have been proposed several techniques of moving a display position of a pointer on a display according to a movement of a remote controller (for example, see Patent Documents 2-4). In the technique of Patent Document 2, when an optic-type pointing device is moved, a light-receiving device moves a display position of a pointer according to a position signal obtained by calculating a variation of a light-receiving signal. In the technique of patent document 3, a TV compares the coordinate of an imaging cursor image included in an image captured by a camera of a remote controller with the coordinate of a display cursor image displayed at this time and generates a cursor image that is to be displayed at a detected remote control pointing position on a display screen. In the technique of patent document 4, when a pointing button of a manipulator is touched, a TV set displays a cursor at a position on the TV screen according to a remote control angle obtained from a light-receiving intensity of infrared light emitted from 4 light-emitting diodes (LEDs).

PRIOR ART DOCUMENTS

Patent document 1: JP 2002-62981
Patent document 2: JP 2006-155345
Patent document 3: JP 2008-181198
Patent document 4: JP 2008-227605

SUMMARY

However, every time a pointing direction of a remote controller of any pointing device mismatches with a pointer position on a display, a user has to reset a standard direction as described above, thus lessening usage convenience of users.

Moreover, when the pointing direction of the remote controller nearly matches the pointer position on the screen by installing a camera on the display, the pointing direction of the remote controller accurately nearly matches the pointer position on the screen only when considering a mounting position of the camera and a photographing angle of the camera.

The present invention provides automatically controlling a pointing direction of a remote controller to almost match a pointer position on a screen. In other words, the present embodiment provides a pointing method in which a center of a manipulating angle range of the remote controller is directed toward a screen center without needing a manipulation of a user even when the position of the remote controller is changed.

The present invention also provides precisely making the pointing direction of a remote controller almost match with a pointer position on the screen of a display by mounting a camera on the display.

As such, a pointing device according to the present invention is able to automatically control a pointing direction of a remote controller to almost match with a pointer position on a screen.

BRIEF DESCRIPTION OF THE DRAWINGS

FIGS. 8(A), 8(B), and 8(C) explain an operation of a remote control direction detector included in an image display apparatus according to the first embodiment of the present invention.

Figure 1:
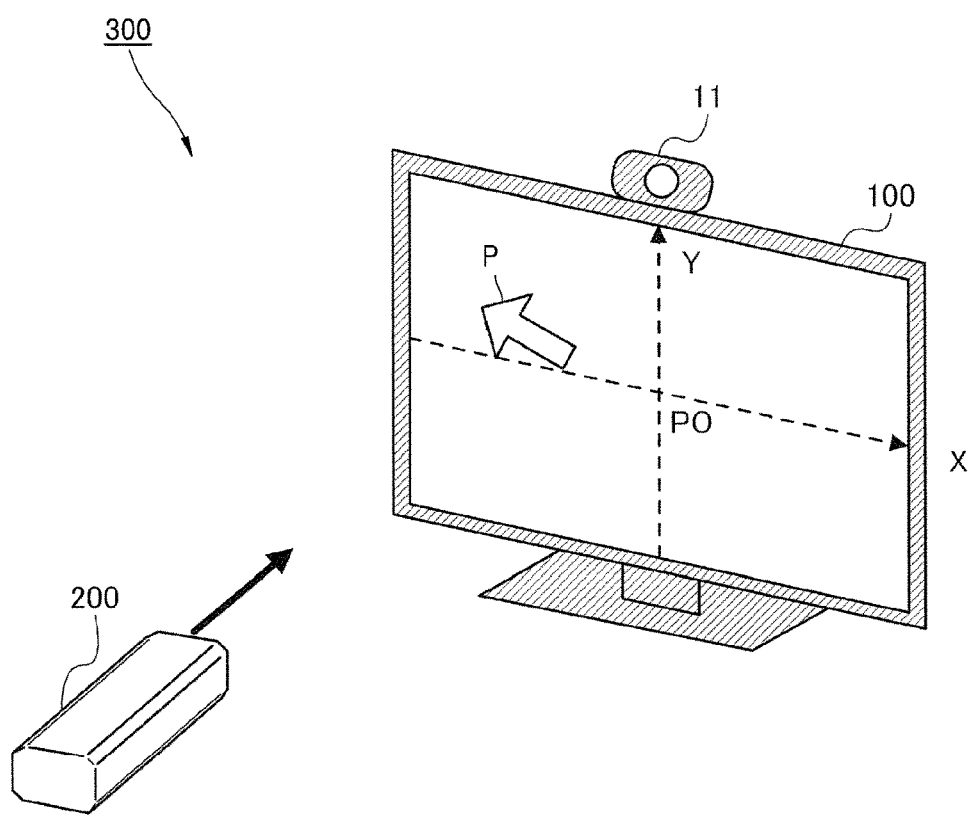
FIG. 1 is a diagram of an image display system according to an embodiment of the present invention.

According to an aspect of the present invention, there is provided an image display apparatus including a reference angle detector configured to detect a reference angle formed by a pointing direction of a remote controller with respect to a reference direction set for a display; a remote control direction detector configured to detect a remote control direction which is a direction in which the remote controller is viewed, from a reference point set on the display; a standard direction adjuster configured to adjust a standard direction set in the remote controller so that the standard direction reaches the reference point on the display as viewed from the remote controller, based on the reference angle and the remote control direction; and a controller configured to control a pointer to be displayed at a corresponding position on the display, based on a pointing angle that is formed by the pointing direction of the remote controller with respect to the standard direction.

The phrase "the standard direction reaches the reference point on the display as viewed from the remote controller" include not only a state where the reference point is on a virtual straight line extending from the remote controller in the reference direction, but also a state where the reference point is around the virtual straight line. In other words, the phrase "the standard direction reaches the reference point on the display as viewed from the remote controller" denotes a state where the reference point is within a virtual cylinder having a predetermined radius and extending from the remote controller in the reference direction.

The standard direction adjuster may adjust the standard direction at regular intervals.

The reference angle detector may include a direction sensor provided in the remote controller; and a reference angle calculator configured to calculate the reference angle based on a reference direction set as a direction representing the reference direction by the direction sensor and based on a remote control direction set as a direction representing the pointing direction of the remote controller by the direction sensor.

The image display apparatus may further include an angular velocity sensor provided in the remote controller; and a pointing angle calculator configured to calculate the pointing angle based on a reference pointing angle and an angular velocity output by the angular velocity sensor. The standard direction adjuster may set an angle formed by the pointing direction with respect to the standard direction, as the reference pointing angle, in the pointing angle calculator. In this case, the pointing angle calculator may store a previous remote control direction corresponding to when the standard direction was adjusted in the past, and calculate the pointing angle when a difference between the previous remote control direction and a current remote control direction is equal to or greater than a threshold value.

The image display apparatus may further include a pointing angle calculator configured to calculate the pointing angle based on a reference pointing angle. The standard direction adjuster may set an angle formed by the pointing direction with respect to the standard direction, as the reference pointing angle, in the pointing angle calculator.

The remote control direction detector may include a camera disposed on the display to be able to photograph the remote controller; and a remote control direction angle calculator configured to calculate a remote control direction angle formed by the remote control direction with respect to a direction perpendicular to the display, based on an image captured by the camera.

The camera may be disposed on a horizontal edge of the display to have a photographing direction parallel to a vertical plane perpendicular to the display. The remote control direction angle calculator may include a first remote control direction angle calculator configured to calculate a first remote control direction angle made by the direction perpendicular to the display and a direction obtained by projecting the remote control direction to a horizontal plane, based on the image captured by the camera; and a second remote control direction angle calculator configured to calculate a second remote control direction angle made by the direction perpendicular to the display and a direction obtained by projecting the remote control direction to the vertical plane, based on the image captured by the camera, a photographing angle made by the display and the photographing direction, a distance from the camera to the remote controller, and a length of a vertical edge of the display. The standard direction adjuster may adjust the standard direction so that the standard direction reaches the reference point on the display as viewed from the remote controller, based on the reference angle, the first remote control direction angle, and the second remote control direction angle. The second remote control direction angle calculator may calculate a photographing remote control angle made by the photographing direction and a direction from the camera to the remote controller, based on the image captured by the camera, and calculate the second remote control direction angle based on a difference between the photographing remote control angle and the photographing angle, the distance, and the length. The image display apparatus may further include a photographing angle calculator configured to calculate the photographing angle, based on an image obtained by photographing the remote controller via the camera disposed to photograph a horizontal direction and based on an image obtained by photographing the remote controller via the camera disposed to have the photographing direction. The camera may be disposed on the center of an upper edge of the display to have a downward photographing direction.

The camera may be disposed on a vertical edge of the display to have a photographing direction parallel to a horizontal plane. The remote control direction angle calculator may include a first remote control direction angle calculator configured to calculate a first remote control direction angle made by the direction perpendicular to the display and a direction obtained by projecting the remote control direction to a vertical plane perpendicular to the display, based on the image captured by the camera; and a second remote control direction angle calculator configured to calculate a second remote control direction angle made by the direction perpendicular to the display and a direction obtained by projecting the remote control direction to the horizontal plane, based on the image captured by the camera, a photographing angle made by the display and the photographing direction, a distance from the camera to the remote controller, and a length of a horizontal edge of the display. The standard direction adjuster may adjust the standard direction so that the standard direction reaches the reference point on the display as viewed from the remote controller, based on the reference angle, the first remote control direction angle, and the second remote control direction angle. The second remote control direction angle calculator may calculate a photographing remote control angle made by the photographing direction and a direction from the camera to the remote controller, based on the image captured by the camera, and calculate the second remote control direction angle based on a difference between the photographing remote control angle and the photographing angle, the distance, and the length. The image display apparatus may further include a photographing angle calculator configured to calculate the photographing angle, based on an image obtained by photographing the remote controller via the camera disposed to photograph a direction parallel to the vertical plane and based on an image obtained by photographing the remote controller via the camera disposed to have the photographing direction.

The controller may include a position calculator configured to calculate a corresponding position on the display, based on the pointing angle; and a display controller configured to control the pointer to be displayed on the corresponding position. The position calculator may calculate the corresponding position so that a distance from the reference point to the corresponding position for each unit angle of the pointing angle increases with an increase in a distance from the display to the remote controller.

According to another aspect of the present invention, there is provided an image display apparatus including a camera provided on a display to be able to photograph a plurality of light sources included in a remote controller and arranged in a predetermined pattern; a remote control posture estimator configured to estimate a posture of the remote controller when the remote controller is photographed, according to the number of light sources photographed by the camera or positions of the light sources; a calibrator configured to calibrate a reference posture of the remote controller to the posture of the remote controller estimated by the remote control posture estimator; and a pointing position estimator configured to estimate a pointing position according to the calibrated reference posture and a posture variation measured by a motion sensor provided in the remote controller.

The remote control posture estimator may include a correspondence memory unit configured to store a correspondence relationship between the number and positions of light sources on an image and a posture of the remote controller when the image is captured; and a posture output unit configured to refer to the correspondence memory unit and to output a posture of the remote controller when the image is captured that corresponds to the number and positions of light sources on the image captured by the camera.

According to another aspect of the present invention, there is provided a pointing method including detecting a reference angle formed by a pointing direction of a remote controller with respect to a reference direction set for a display; detecting a remote control direction which is a direction in which the remote controller is viewed, from a reference point set on the display; adjusting a standard direction set in the remote controller so that the standard direction reaches the reference point on the display as viewed from the remote controller, based on the reference angle and the remote control direction; and controlling a pointer to be displayed at a corresponding position on the display, based on a pointing angle that is formed by the pointing direction of the remote controller with respect to the standard direction.

According to another aspect of the present invention, there is provided a pointing method including estimating a posture of a remote controller when the remote controller is photographed, according to the number or positions of light sources of the remote controller that are photographed by a camera provided on a display; calibrating a reference posture of the remote controller to the estimated posture of the remote controller; estimating a pointing position according to the calibrated reference posture and a posture variation measured by a motion sensor provided in the remote controller; and displaying an object on the estimated pointing position on a pointing target according to the estimated a pointing position.

The estimating of the posture of the remote controller may include memorizing a correspondence relationship between the number and positions of light sources on an image and a posture of the remote controller when the image is captured; and referring to the stored correspondence and outputting a posture of the remote controller when the image is captured that corresponds to the number and positions of light sources on the image captured by the camera.

According to another aspect of the present invention, there is provided a remote controller that points to an image display apparatus, the remote controller including a light-emission device having at least one light source; a direction sensor configured to sense a remote control direction value representing a direction in which the remote controller points; a manipulator configured to manipulate pointing to the image display apparatus; and a controller configured to turn on the at least one light source of the light-emission device according to a pointing manipulation of the manipulator, modulate the remote control direction value sensed by the direction sensor into a remote control code, and output the remote control code to the image display apparatus via the light-emission device. The remote control direction value transmitted to the image display apparatus is used by the image display apparatus to determine a pointing position on a display of the image display apparatus.

According to another aspect of the present invention, there is provided a method of controlling a remote controller that points an image display apparatus, the method including turning on at least one light source of a light-emission device according to a pointing manipulation input and sensing a remote control direction value representing a direction in which the remote controller points; transforming the sensed remote control direction value into a remote control code; and outputting the remote control code to the image display apparatus via the light-emission device. The remote control direction value transmitted to the image display apparatus is used by the image display apparatus to determine a pointing position on a display of the image display apparatus.

According to another aspect of the present invention, there is provided a computer program for executing a function of detecting a reference angle formed by a pointing direction of a remote controller with respect to a reference direction set for a display; a function of detecting a remote control direction which is a direction in which the remote controller is viewed, from a reference point set on the display; a function of adjusting a standard direction set in the remote controller so that the standard direction reaches the reference point on the display as viewed from the remote controller, based on the reference angle and the remote control direction; and a function of controlling a pointer to be displayed at a corresponding position on the display, based on a pointing angle that is formed by the pointing direction of the remote controller with respect to the standard direction.

DETAILED DESCRIPTION

An image display system 300 operating based on a relative pointing method according to an embodiment of the present invention will now be described.

The image display system 300 includes a TV 100 corresponding to an embodiment of an image display apparatus as shown in FIG. 1, and a remote controller 200 including an angular velocity sensor 21 and a direction sensor 22 and manipulating the TV 100. The TV 100, which is an example of an image display apparatus, receives broadcasting content including a video and audio from a broadcasting station and displays the video on the screen of the TV 100 and simultaneously outputs the audio. The TV 100 also displays, on the screen, an image via which a manipulation such as broadcast content selection is performed.

The remote controller 200 is used to perform the manipulation, such as broadcast content selection, on the image displayed on the screen.

Figure 2:
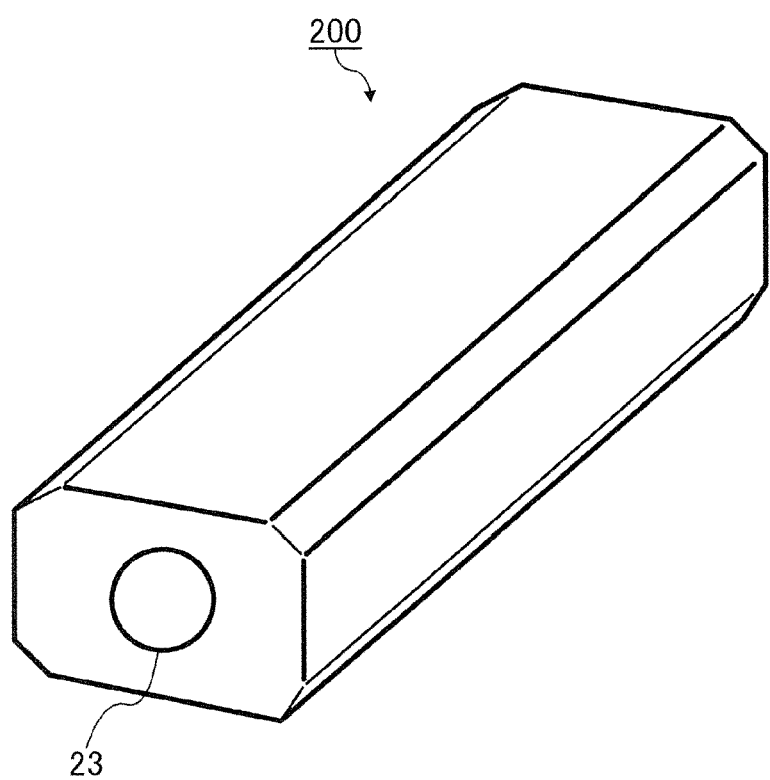
FIG. 2 is a perspective view of the exterior of a remote controller that is used in an embodiment of the present invention.

A camera 11 for photographing the remote controller 200 is mounted on the center of the top of the TV 100, and a light-emitting diode (LED) marker 23 for enabling the camera 11 to easily and accurately recognize the location of the remote controller 200 is provided on a leading end of the remote controller 200, as shown in FIG. 2. The LED marker 23 is described as a visible LED.

The camera 11 is described as a visible light color camera. The image display apparatus is not limited to a TV, and a PC, a signage monitor, or the like may be used as the image display apparatus. In this case, the image display apparatus denotes a liquid crystal monitor, an organic EL monitor, or the like.

The image display system 300 calculates a pointing angle A2, which is formed by a pointing direction PD of the remote controller 200 with respect to a standard direction SD set in the remote controller 200, based on outputs of the angular velocity sensor 21 and the direction sensor 22. The image display system 300 is configured to display a pointer P on the screen of the TV 100, as a point at which the pointing direction PD of the remote controller 200 points by accumulatively performing rotational transformation with respect to the pointing angle A2.

Figure 3:
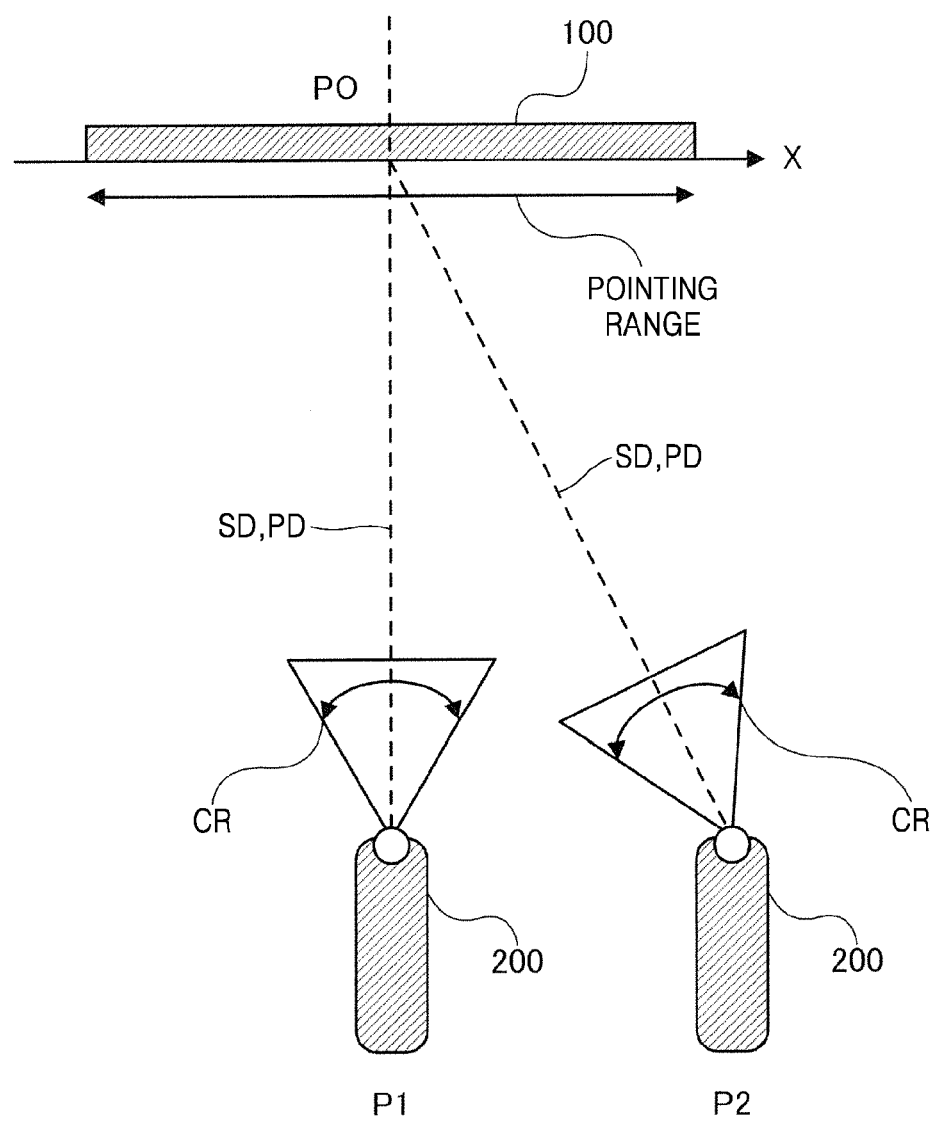
FIGS. 3 and 4 are views for explaining an outline of an operation according to an embodiment of the present invention.
Figure 4:
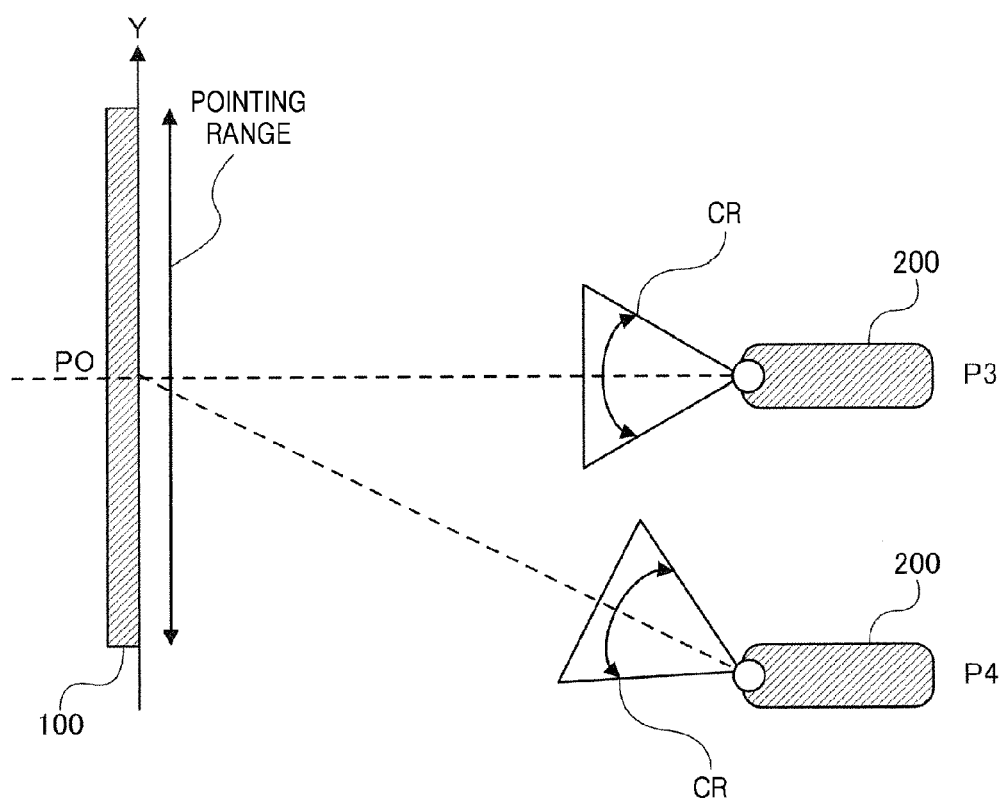

FIG. 3 illustrates a position relationship between the TV 100 and the remote controller 200 as viewed from the top, and FIG. 4 illustrates a position relationship between the TV 100 and the remote controller 200 as viewed from the lateral side.

It is assumed that a user moves the remote controller 200 in parallel rightwards or downwards such that the remote controller 200 is located at a position P2 of FIG. 3 or a position P4 of FIG. 4.

Referring to FIGS. 3 and 4, a manipulating angle range CR having a predetermined solid angle when a virtual straight line along the standard direction SD is a central axis is set in the remote controller 200, and the manipulating angle range CR and a pointing range of the TV 100 are set to establish a predetermined relationship. In other words, by adjusting the size of the manipulating angle range CR, a sensitivity of the pointer P with respect to a posture variation of the remote controller 200 is adjusted.

When a feature in an operation of the image display system 300 according to an embodiment is described with reference to FIGS. 3 and 4, even when the position of the remote controller 200 varies, the central axis of the manipulating angle range CR, which is the standard direction SD, is directed toward a screen center PO of the TV 100 as shown in P1 and P2 of FIGS. 3 and 4. Accordingly, regardless of positions of the remote controller 200, a point at which the pointing direction PD of the remote controller 200 points continuously nearly matches with a position of the pointer P. A detailed structure for accomplishing this operation will be described later in detail.

First, respective operations of an image display apparatus 100 and a remote controller 200 that constitute an image display system will be described.

Figure 5:
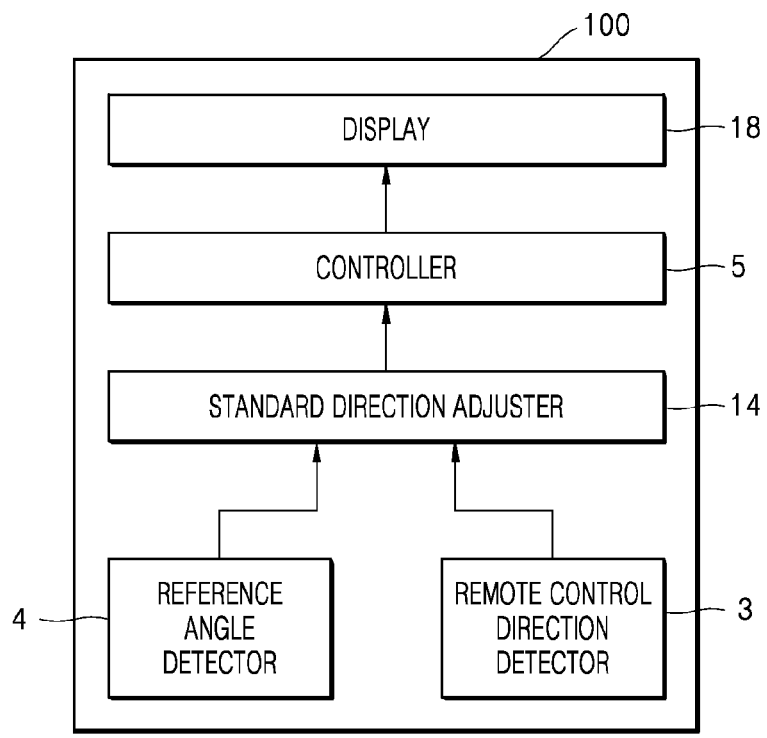
FIG. 5 is a block diagram of an image display apparatus according to an embodiment of the present invention.

FIG. 5 is a block diagram of the image display apparatus 100 according to an embodiment of the present invention.

The image display apparatus 100 of FIG. 5 includes a reference angle detector 4, a remote control direction detector 3, a standard direction adjuster 14, a controller 5, and a display 18. The controller 5 includes a coordinate calculator 16 and a display controller 17 disclosed in descriptions of image display systems according to first through fourth embodiments which will be described later.

The reference angle detector 4 detects a reference angle AC that is formed by a pointing direction COM of the remote controller 200 with respect to a reference direction CO set for a display. In this case, the pointing direction COM of the remote controller 200 is detected from the direction sensor 22 provided in the remote controller 200. In more detail, the reference angle detector 4 calculates the reference angle AC, based on a reference direction set as a direction value output by the direction sensor 22 included in the remote controller 200 when the pointing direction COM of the remote controller 200 is perpendicular to the display, and a remote control direction COM set as a direction value output by the direction sensor 22 in correspondence with the pointing direction COM of the remote controller 200.

The remote control direction detector 3 detects a remote control direction RD, which is a direction in which the remote controller 200 is viewed from a reference point PO set on the display. The remote control direction RD is detected from an image of the remote controller 200 photographed by the camera 110 provided in the image display apparatus 100.

The standard direction adjuster 14 adjusts a standard direction SD set in the remote controller 200 so that the standard direction SD reaches the reference point PO on the display of the image display apparatus 100 as viewed from the remote controller 200, based on the reference angle AC detected by the reference angle detector 4 and the remote control direction RD detected by the remote control direction detector 3.

The controller 5 controls the pointer P to be displayed at a corresponding pointing position on the display of the image display apparatus 100, based on a pointing angle that is formed by a pointing direction of the remote controller with respect to the standard direction SD.

Thus, according to an embodiment of the present invention, the pointing direction COM of the remote controller 200 and the position of the pointer P on the screen may be automatically adjusted to nearly match with each other by using remote control direction information output by the direction sensor 22 included in the remote controller 200 and the camera 110 mounted on the image display apparatus 100.

Figure 6:
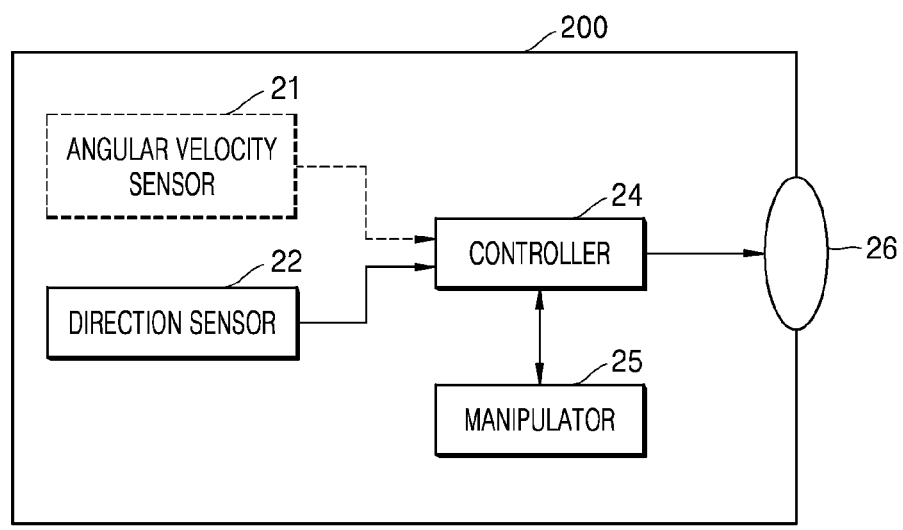
FIG. 6 is a block diagram of a remote controller according to an embodiment of the present invention.

FIG. 6 is a block diagram of the remote controller 200 according to an embodiment of the present invention.

A light-emission device 26 includes an LED marker 23 and emits light with at least one light source. The at least one light source may be configured in a predetermined arrangement pattern.

A direction sensor 22 senses a remote control direction value representing a direction in which the remote controller 200 points.

An angular velocity sensor 21, which is optionally included, senses an angular velocity value corresponding to a motion of the remote controller 200. According to an embodiment, the angular velocity sensor 21 may use a gyroscope.

A manipulator 25 manipulates pointing of an image display apparatus.

A controller 24 turns on the at least one light source of the light-emission device 21 according to a pointing manipulation of the manipulator 25, modulates the remote control direction value sensed by the direction sensor 22 and/or the angular velocity value sensed by the angular velocity sensor 210 into a remote control code, and outputs the remote control code to the image display apparatus 100 via the light-emission device 26.

The remote control direction value transmitted to the image display apparatus 100 is used by the image display apparatus 100 to determine the pointing position on the display of the image display apparatus 100.

A pointing operation of an image display system 300 including the image display apparatus 100 and the remote controller 200 will now be described.

Figure 7:
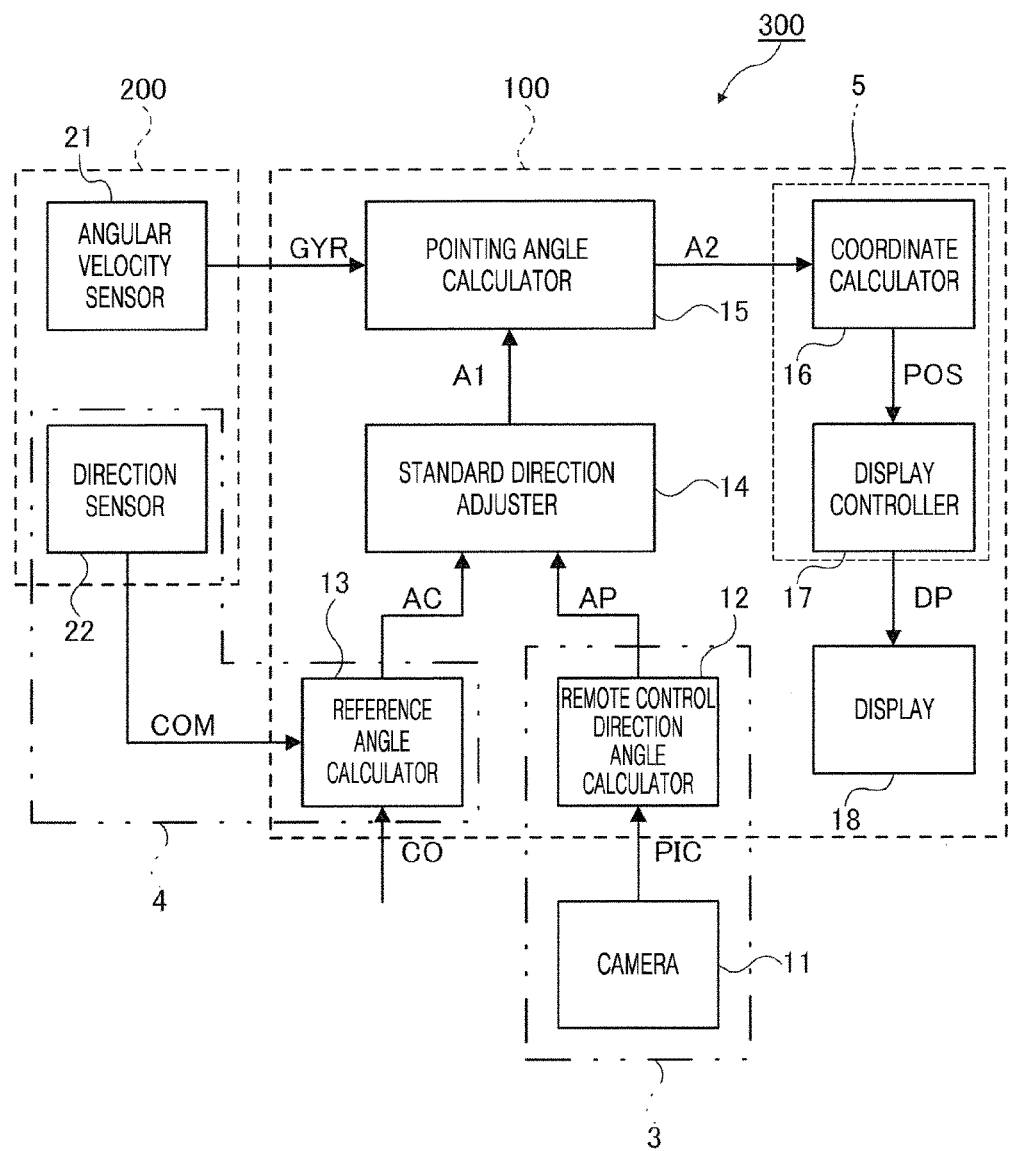
FIG. 7 is a block diagram of an image display system according to a first embodiment of the present invention.

A structure of an image display system 300 according to a first embodiment is as shown in FIG. 7, and the image display system 300 includes a remote control direction detector 3, a reference angle detector 4, a standard direction adjuster 14, a pointing angle calculator 15, a coordinate calculator 16, a display controller 17, and a display 18. In a computing apparatus including a central processing unit (CPU), a memory, an input/output unit within the TV 100, a program for pointing devices stored in the memory is carried out, and thus a function of each of the aforementioned components is performed.

Each component will be described in connection with operations from inputting by the remote controller 200 to displaying of a manipulating screen image DP overlapped by the pointer P on the TV 100. Although the operations will now be described based on a horizontal plane which is an X-Z plane, the operations may be performed based on a Y-Z plane. Thus, the image display system 300 according to the present invention may adjust the standard direction SD for any of horizontal and vertical directions to be directed toward the screen center PO.

The remote control direction detector 3 detects the remote control direction RD, which is the direction in which the remote controller 200 is viewed from the screen center PO, which is a reference point set in the TV 100, as shown in FIG. 8C. The remote control direction RD may be defined by a virtual straight line that connects the screen center PO to a leading end of the remote controller 200. According to a first embodiment, a direction extending from the virtual straight line and the standard direction SD are set to continuously match with each other.

According to a first embodiment, the remote control direction detector 3 includes a camera 11 which heads from the TV 100 to a user side and photographs the LED marker 23 of the remote controller 200, and a remote control direction angle calculator 12 which calculates the remote control direction angle AP formed by the remote control direction RD with respect to a direction perpendicular to the screen center PO, as a value representing the remote control direction RD based on a camera picture PIC captured by the camera 11.

The remote control direction angle calculator 12 binarizes a camera picture PIC shown in FIG. 8A, as shown in FIG. 8B, and generates a binary picture of which only the LED marker 23 is emphasized. The remote control direction angle calculator 12 calculates a separation distance DET in the binary picture from a center line of the TV 100 to a detection position of the LED marker 23. Since a relationship determined only according to the characteristics of the camera 11 exists between the separation distance DET and a remote control direction angle AP shown in FIG. 8C, the remote control direction angle calculator 12 may calculate the remote control direction angle AP from the separation distance DET and consequently may specify the remote control direction RD.

According to a first embodiment, detection is performed based on the brightness of the LED marker 23. However, for example, detection may be performed based on a color, a flickering pattern, or the like of the LED marker 23. A reflection marker or the like may be used instead of the LED marker 23. One LED marker 23 or at least two LED markers 23 may be used, and the LED marker 23 may have various shapes.

Figure 9:
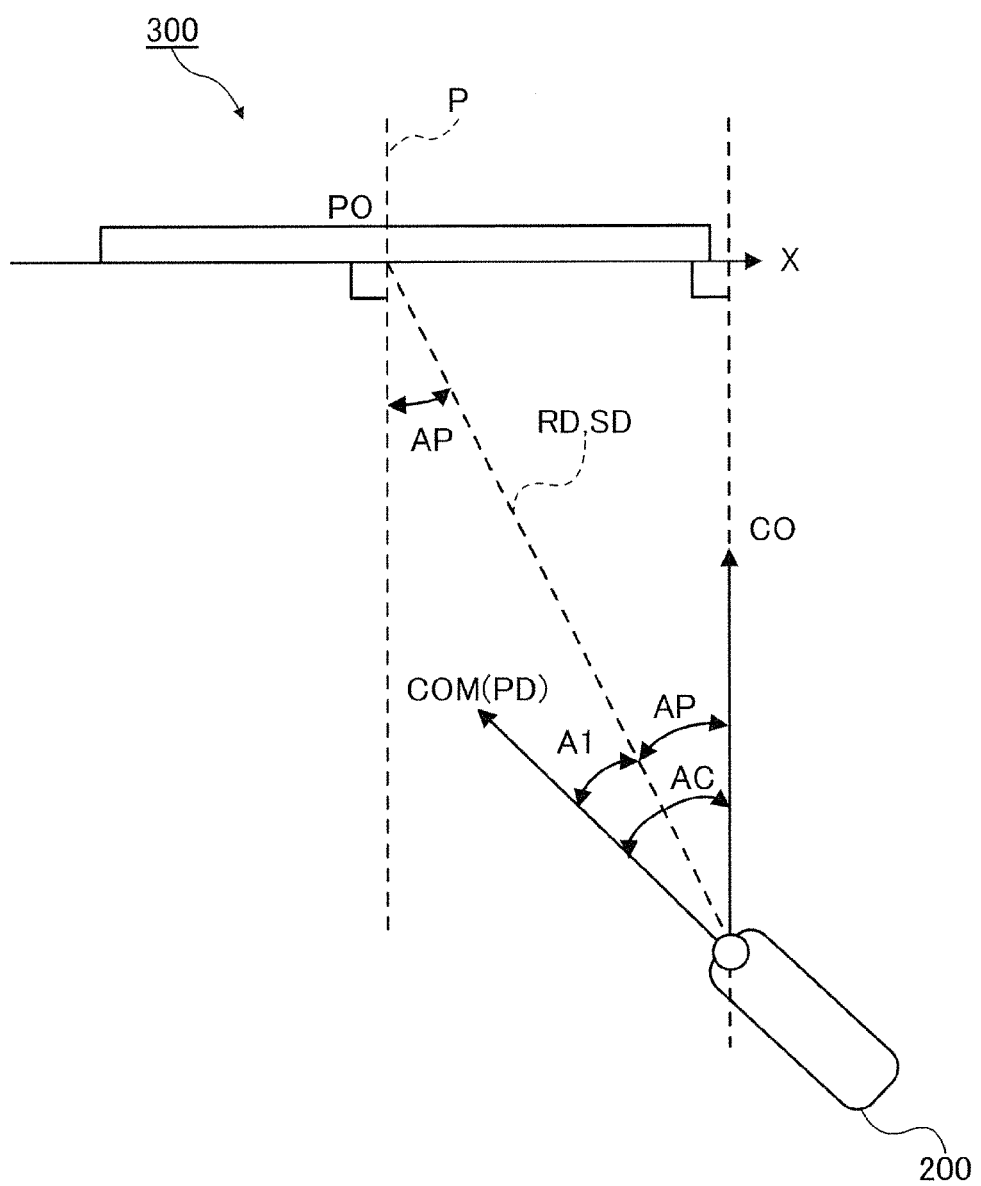
FIG. 9 illustrates relationships among angles in the first embodiment of the present invention.

The reference angle detector 4 will now be described with reference to FIGS. 7 and 9. FIG. 9 omits the manipulating angle range CR for easy understanding and illustrates only the standard direction SD. However, in practice, the manipulating angle range CR shown in FIGS. 3, 4, and 8C sets the standard direction SD as a center axis thereof.

The reference angle detector 4 detects the reference angle AC that is formed by the pointing direction PD of the remote controller 200 with respect to the reference direction CO set for the TV 100. According to a first embodiment, the reference direction CO is set to be perpendicular to the TV 100, and the reference angle detector 4 detects how much degree the pointing direction PD of the remote controller 200 is tilted with respect to the reference direction CO. In other words, the reference angle AC is represented as an absolute value of an angle by which the pointing direction PD of the remote controller 200 is tilted with respect to the screen of the TV 100, namely, a tilting angle with respect to the reference direction CO.

In more detail, as shown in FIG. 7, the reference angle detector 4 includes the direction sensor 22 and the reference angle calculator 13. The direction sensor 22 outputs the pointing direction PD, in which the leading end of the remote controller 200 points, as a numerical value. Hereinafter, a direction output by the direction sensor 22 when the pointing direction PD of the remote controller 200 matches with the reference direction CO perpendicular to the screen of the TV 100 as shown in FIG. 9 will be referred to as the reference direction CO, and a direction currently-being output by the direction sensor 22 in correspondence with the pointing direction PD of the remote controller 200 will be referred to the remote control direction COM. The reference direction CO may be previously set by disposing the remote controller 200 in a direction perpendicular to the screen of the TV 100 after driving the TV 100, and by reading a value of the remote control direction COM output by the direction sensor 22 at this time. Alternatively, instead of manually setting the reference direction CO after driving the TV 100, the reference direction CO may be automatically set in advance by, for example, providing a direction sensor in the TV 100.

The reference angle calculator 13 calculates a reference angle AC of FIG. 9 from a difference between the reference direction CO and the remote control direction COM. Since the reference angle AC is obtained based on the direction sensor 22, the reference angle AC is only determined for the pointing direction PD of the remote controller 200.

A structure in which the standard direction adjuster 14 appropriately changes the standard direction SD based on the remote control direction RD and the reference angle AC respectively detected by the remote control direction detector 3 and the reference angle detector 4, will now be described.

The standard direction adjuster 14 adjusts the standard direction SD such that the standard direction SD, which is the center of the manipulating angle range CR, matches with the remote control direction RD. In other words, when the pointing direction PD of the remote controller 200 points to the screen center PO, the standard direction adjuster 14 appropriately changes the standard direction SD such that the standard direction SD matches with the remote control direction RD.

In more detail, the standard direction adjuster 14 calculates a reference pointing angle A1, which is used as an initial value by the pointing angle calculator 15, which will be described later, as shown in FIG. 7, from the remote control direction angle AP and the reference angle AC representing the remote control direction RD, and updates the reference pointing angle A1 to thereby adjust the standard direction SD to face the screen center PO.

The reference pointing angle A1 will now be described.

The reference pointing angle A1 represents how much degree the current pointing direction PD of the remote controller 200 is tilted when the pointing direction PD of the remote controller 200 points to the screen center PO. Thus, as shown in FIG. 9, the reference pointing angle A1 may be obtained by subtracting the remote control direction angle AP from the reference angle AC. This is obvious in view of a relationship in which a line extending from the screen center PO to be perpendicular to the screen and the reference direction CO are parallel and thus create alternate angles. The reference pointing angle A1 may be considered as an accurate value detected based on the reference direction CO by the remote control direction detector 3 and the reference angle detector 4.

The pointing angle calculator 15 will now be described.

The pointing angle calculator 15 calculates a current pointing angle A2, based on the reference pointing angle A1 and an angular velocity output by the angular velocity sensor 21. In other words, the pointing angle calculator 15 uses the reference pointing angle A1 as an initial value, and calculates the current pointing angle A2 by accumulatively repeating rotational transformation on the angular velocity output by the angular velocity sensor 21 from the initial value. The pointing angle A2 currently held by the pointing angle calculator 15 is set to be replaced with the reference pointing angle A1 by the reference direction adjuster 14 at regular intervals, and, almost all the time, the standard direction SD is continuously directed to the screen center PO.

The reference pointing angle A1 used by the pointing angle calculator 15 is calculated based on an output of the direction sensor 22, and a subsequently-calculated current pointing angle A2 is based on the angular velocity output by the angular velocity sensor 21. In other words, by using the angular velocity sensor 21, which is more highly responsive than the direction sensor 22, to calculate the pointing angle A2, the pointer P follows well a motion of the remote controller 200. According to an embodiment, the angular velocity sensor 21 may be a gyroscope.

The coordinate calculator 16 is an example of a position calculator for calculating a corresponding position on the display. The coordinate calculator 16 calculates a corresponding pointing coordinate position POS based on the pointing angle A2.

The display controller 17 outputs a manipulating screen image DP obtained by overlapping a basic screen image, such as a menu screen image, with the pointer P based on the pointing coordinate position POS. The controller 5 including the coordinate calculator 16 and the display controller 17 is an example of a controller that controls a pointer to be displayed at a corresponding position on the display.

Finally, the display 18 displays the manipulating screen image DP on the TV 100.

As such, the image display system 300 according to a first embodiment may calculate a current reference pointing angle A1 corresponding to when the standard direction SD of the remote controller 200 faces the screen center PO, based on the remote control direction RD detected by the remote control direction detector 3 and the reference angle AC, which is an absolute value based on the TV 100, detected by the reference angle detector 4. By replacing the reference pointing angle A1 with the current pointing angle A2 currently being used by the pointing angle calculator 15, an angle calculation based on a state in which the standard direction SD faces the screen center PO may be automatically reset.

Thus, even when a relative position of the remote controller 200 with respect to the TV 100 has changed, the current pointing angle A2 owned by the pointing angle calculator 15 is replaced by the reference pointing angle A1 calculated by the standard direction adjuster 14, and thus a point on the screen to which the pointing direction PD of the remote controller 200 points may nearly match with a position of the pointer P on the screen.

The standard direction adjuster 14 calculates the reference pointing angle A1 at regular intervals and updates the current pointing angle A2 possessed by the pointing angle calculator 15. Consequently, the standard direction SD is regularly adjusted to head the screen center PO.

Thus, a user does not need to perform a reset operation to direct the standard direction SD toward the screen center PO as in the prior art.

Accordingly, the user is able to naturally manipulate the pointer P via the remote controller 200.

Figure 10:
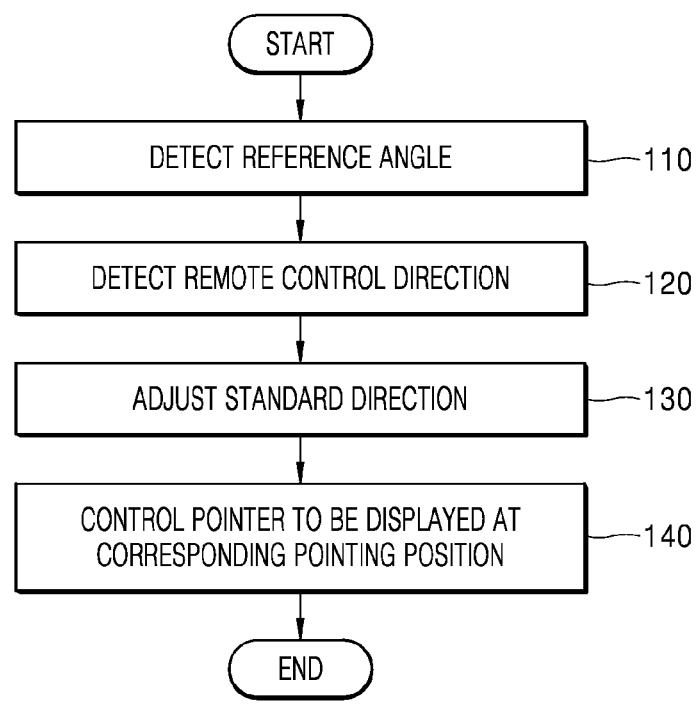
FIG. 10 is a flowchart of a pointing method performed by an image display apparatus, according to an embodiment of the present invention.

FIG. 10 is a flowchart of a pointing method performed by the image display apparatus 100, according to an embodiment of the present invention.

In operation 110, the image display apparatus 100 detects the reference angle AC that is formed by the pointing direction COM of the remote controller 200 with respect to the reference direction CO set for the display. In this case, the pointing direction COM of the remote controller 200 is detected from the direction sensor 22 provided in the remote controller 200.

In operation 120, the image display apparatus 100 detects the remote control direction RD, which is the direction in which the remote controller 200 is viewed from the reference point PO set on the display of the image display apparatus 100. The remote control direction RD is detected from an image of the remote controller 200 photographed by the camera 110 provided in the image display apparatus 100.

In operation 130, the image display apparatus 100 adjusts the standard direction SD set in the remote controller 200 so that the reference point PO is on the display of the image display apparatus 100 when the remote controller 200 is directed in the standard direction SD, based on the reference angle AC and the remote control direction RD.

In operation 140, the image display apparatus 100 controls the pointer P to be displayed at a corresponding pointing position on the display of the image display apparatus 100, based on a pointing angle formed by a pointing direction of the remote controller 200 with respect to the standard direction SD.

Thus, according to an embodiment of the present invention, the pointing direction COM of the remote controller 200 and the position of the pointer P on the screen may be automatically adjusted to nearly match with each other by using remote control direction information output by the direction sensor 22 included in the remote controller 200 and the camera 110 mounted on the image display apparatus 100.

Figure 11:
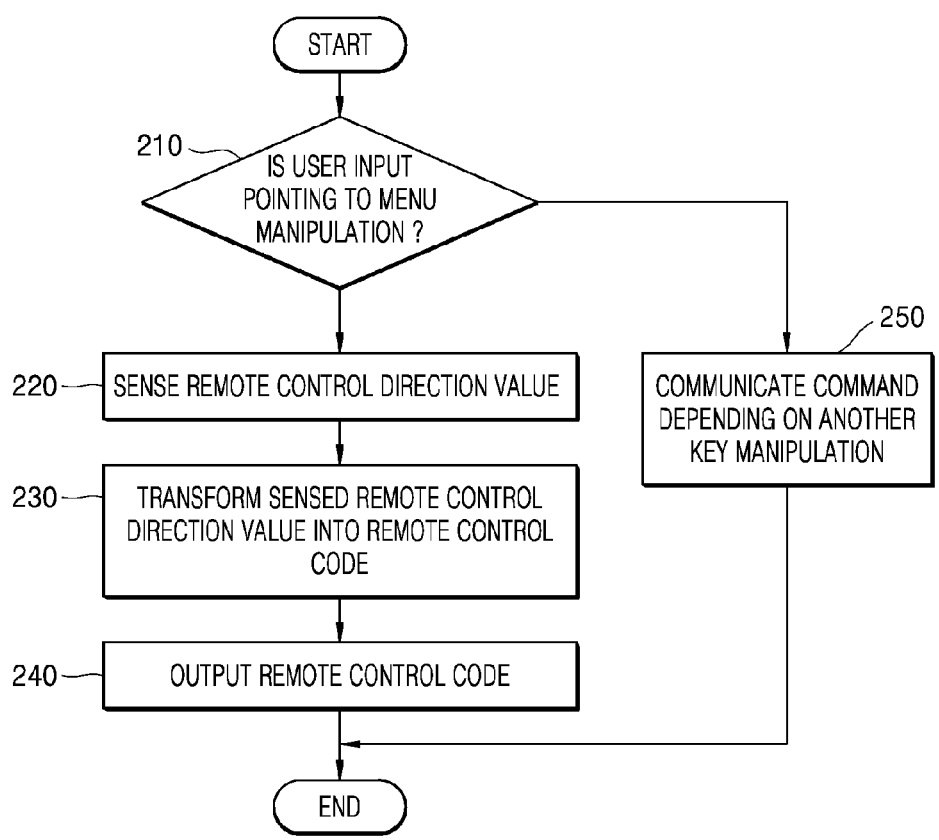
FIG. 11 is a flowchart of a remote controlling method performed by a remote controller, according to an embodiment of the present invention.

FIG. 11 is a flowchart of a remote controlling method performed by the remote controller 200, according to an embodiment of the present invention.

In operation 210, the remote controller 200 determines whether a user input is a pointing menu manipulation.

In operation 220, the remote controller 200 turns on a light-emission device according to a pointing manipulation input and senses a remote control direction value representing a direction in which the remote controller 200 points.

In operation 250, the remote controller 200 communicates a command depending on another key manipulation, when there are no pointing manipulation inputs.

In operation 230, the remote controller 200 transforms the sensed remote control direction value into a remote control code.

In operation 240, the remote controller 200 outputs the remote control code to the image display apparatus 100 via the light-emission device.

Accordingly, the remote control direction value transmitted to the image display apparatus 100 is used by the image display apparatus 100 to determine a pointing position on the display of the image display apparatus 100.

Figure 12:
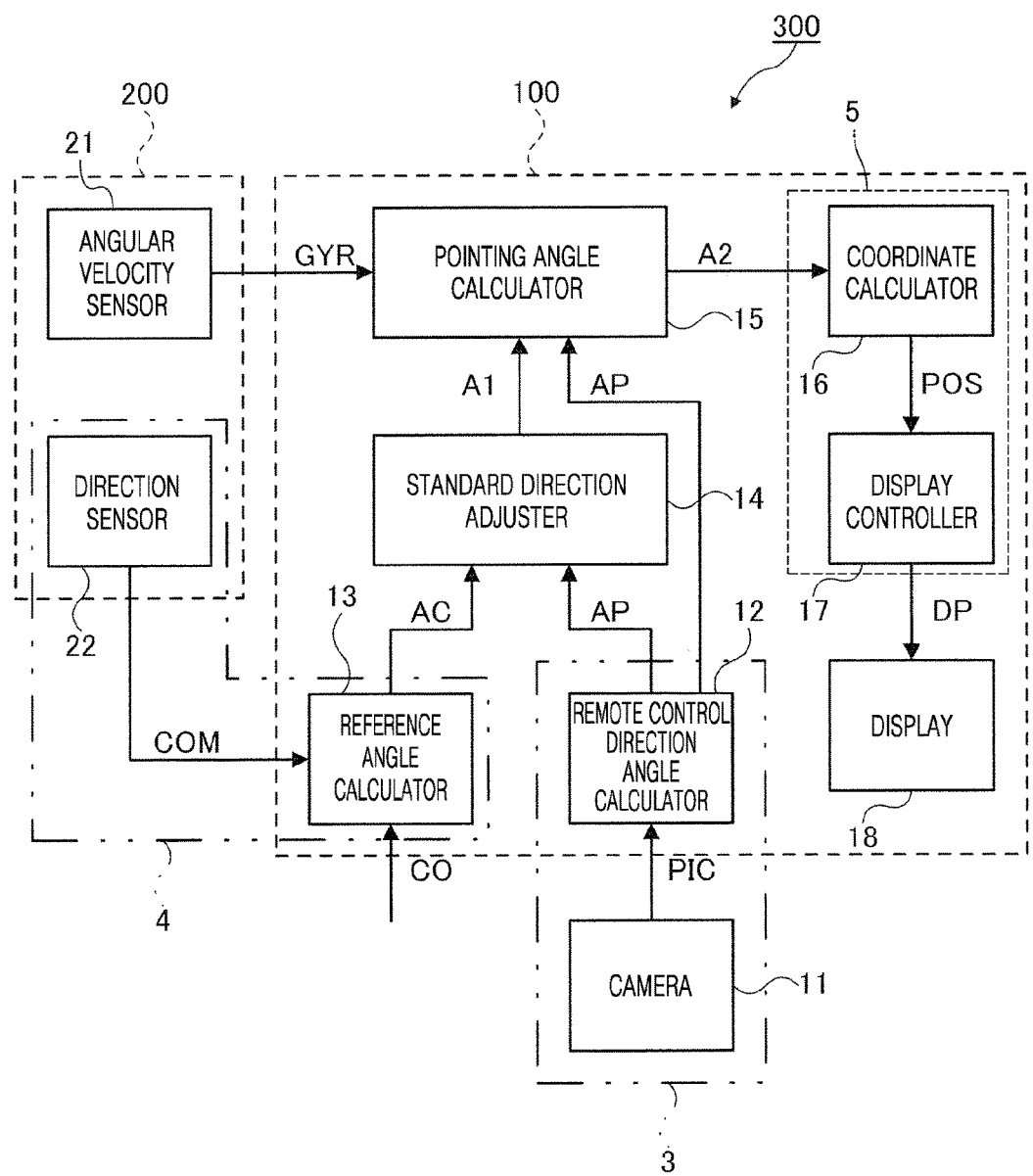
FIG. 12 is a block diagram of an image display system according to a second embodiment of the present invention.

Next, an image display system 300 according to a second embodiment of the present invention will be described with reference to FIG. 12. In the description below, like reference numerals or characters are assigned to components corresponding to those according to the first embodiment.

The image display system 300 according to the second embodiment is different from the image display system 300 according to the first embodiment in that the pointing angle calculator 15 acquires the remote control direction angle AP output by the remote control direction detector 3.

The pointing angle calculator 15 stores a previous remote control direction angle AP replaced by the reference pointing angle A1 output by the standard direction adjuster 14.

The pointing angle calculator 15 compares a new remote control direction angle AP output by the remote control direction detector 3 with the previous remote control direction angle AP. When the new remote control direction angle AP is different from the previous remote control direction angle AP by a predetermined value or greater, the pointing angle calculator 15 allows a current pointing angle A2 to be replaced by the reference pointing angle A1.

In the image display system 300 according to a second embodiment, for example, only when a relative position of the remote controller 200 with respect to the TV 100 varies as shown in FIG. 3 and the remote control direction angle AP output by the remote control direction detector 3 has been changed a predetermined value or greater, the standard direction SD may be adjusted.

Thus, the standard direction SD is surely adjusted before a point at which the pointing direction PD of the remote controller 200 points to the screen is largely mismatched with a position of the pointer P, and thus the point at which the pointing direction PD of the remote controller 200 points to the screen and the position of the pointer P may continuously match with each other.

Figure 13:
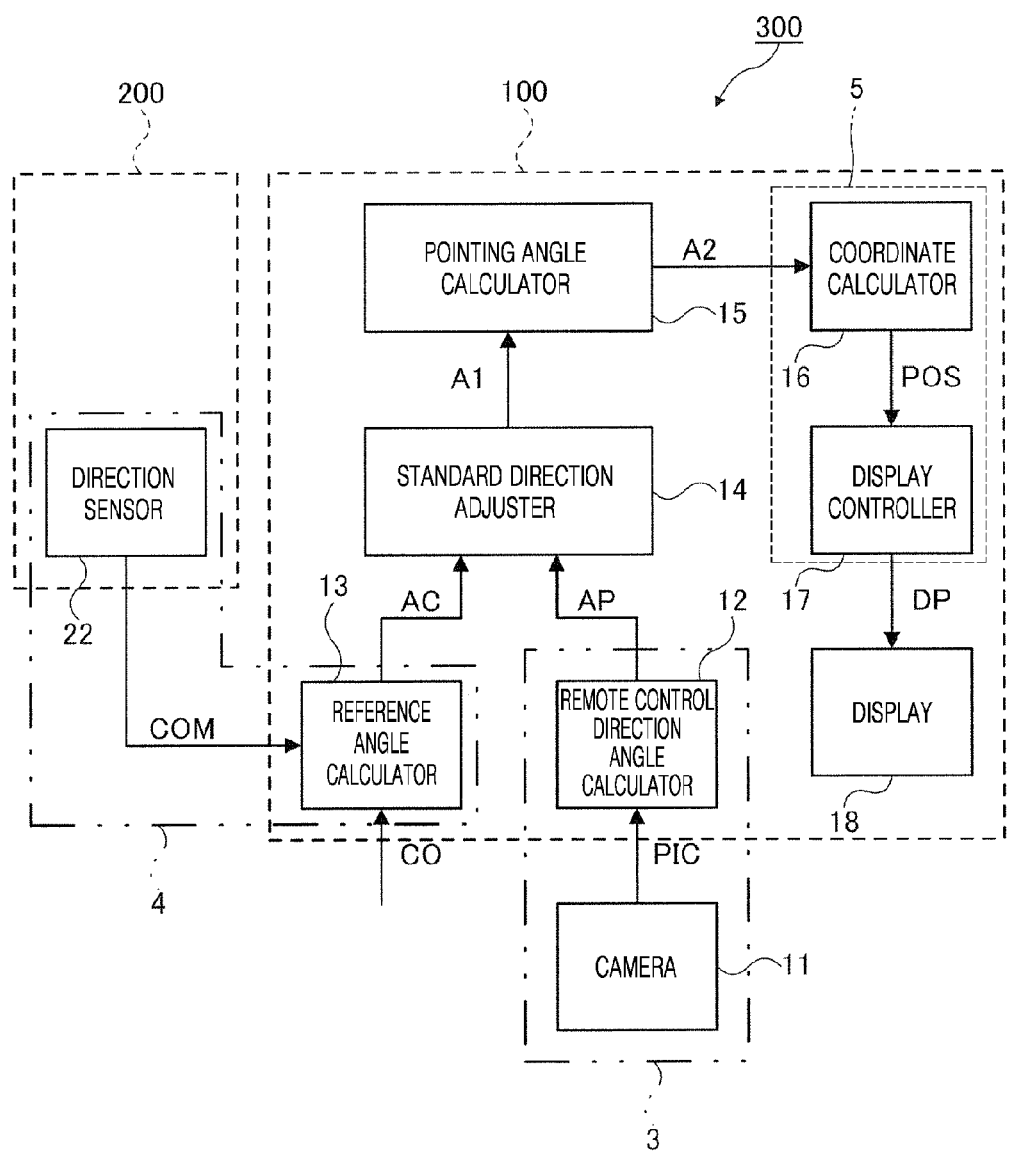
FIG. 13 is a block diagram of an image display system according to a third embodiment of the present invention.

Next, an image display system 300 according to a third embodiment of the present invention will be described with reference to FIG. 13.

The image display system 300 according to the third embodiment is different from the image display system 300 according to the first embodiment in that the angular velocity sensor 21 is omitted and the pointing angle calculator 15 calculates the pointing angle A2 based on the reference pointing angle A1. In more detail, in the image display system 300 according to a third embodiment, the pointing angle calculator 15 outputs, as the pointing angle A2, the reference pointing angle A1 regularly calculated based on the remote control direction angle AP output by the remote control direction detector 3 and the reference angle AC output by the reference angle detector 4.

Accordingly, costs may be reduced by providing a single sensor in the remote controller 200, and the pointing direction PD of the remote controller 200 and the position of the pointer P may continuously match with each other by the standard direction SD always being directed toward the screen center PO.

Figure 14:
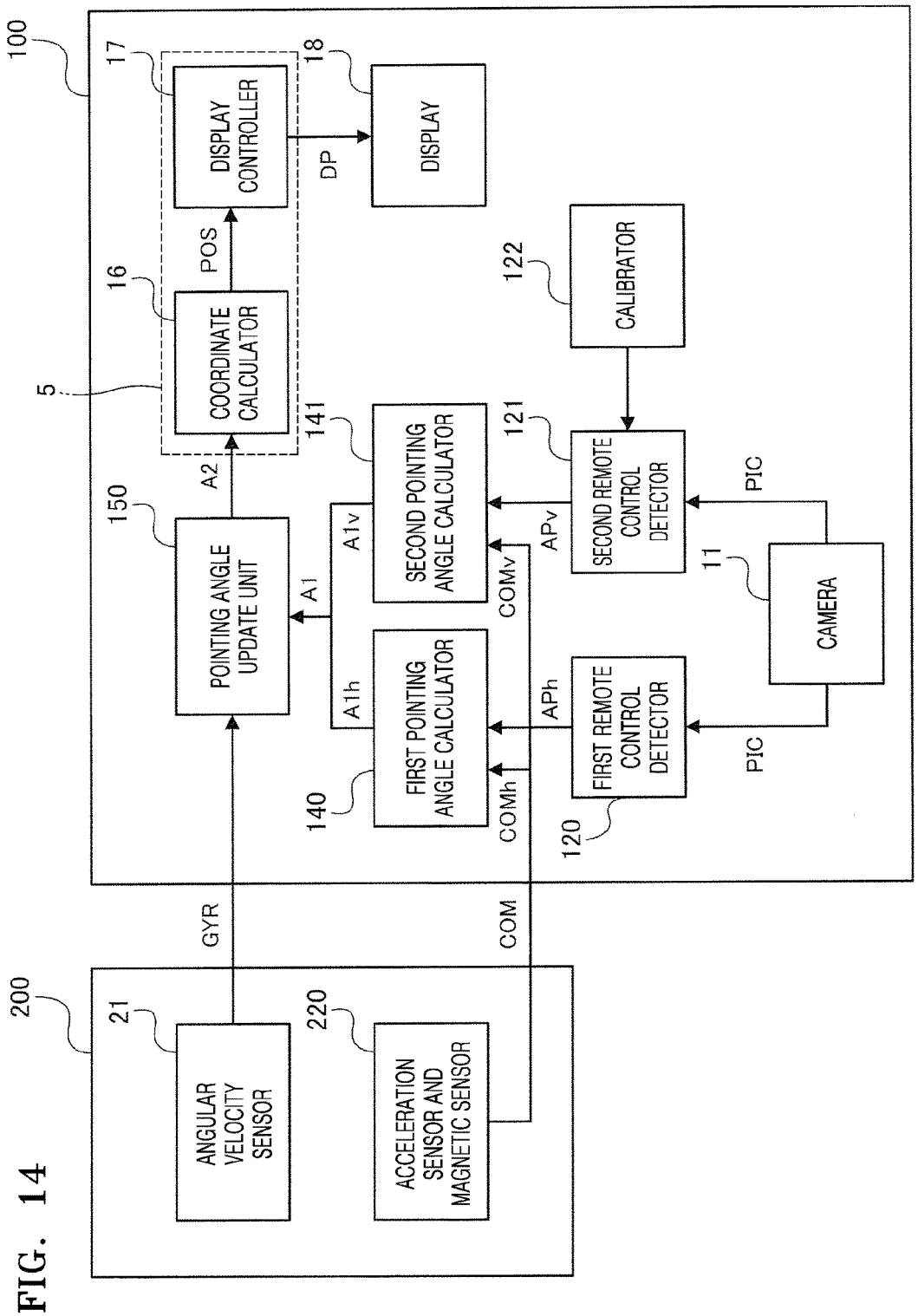
FIG. 14 is a functional block diagram of an image display system according to a fourth embodiment of the present invention.

FIG. 14 is a functional block diagram of an image display system according to a fourth embodiment of the present invention.

As described above, a TV 100 includes a camera 11. As shown in FIG. 14, the TV 100 includes a first remote control detector 120, a second remote control detector 121, a calibrator 122, a first pointing angle calculator 140, a second pointing angle calculator 141, a pointing angle update unit 150, a coordinate calculator 16, a display controller 17, and a display 18.

The camera 11 generates a camera picture PIC by photographing a scene of a screen side of the TV 100 (i.e., a viewer side), and outputs the camera picture PIC to the first remote control detector 120 and the second remote control detector 121. According to the present embodiment, the camera 11 is provided as photographing means.

The first remote control detector 120 detects an LED marker mounted on a remote controller 200 from the camera picture PIC output by the camera 11. The first remote control detector 120 calculates a remote control direction angle APh made by a direction perpendicular to the screen of the TV 100 and a horizontal component (component projected to a horizontal plane) in a direction from the screen center PO to the remote controller 200, and outputs the remote control direction angle APh to the first pointing angle calculator 140. According to the present embodiment, the remote control direction angle APh is used as an example of a first remote control direction angle made by a direction perpendicular to a display and a direction obtained by projecting a remote control direction to a surface, and the first remote control detector 120 is provided as an example of a first remote control direction angle calculator that calculates the first remote control direction angle. An operation of the first remote control detector 120 will be described in detail later.

The second remote control detector 121 detects the LED marker mounted on the remote controller 200 from the camera picture PIC output by the camera 11. The second remote control detector 121 calculates a remote control direction angle APv made by the direction perpendicular to the screen of the TV 100 and a vertical component (component projected to a vertical plane that passes through the screen center PO and is perpendicular to the screen) in the direction from the screen center PO to the remote controller 200, and outputs the remote control direction angle APv to the second pointing angle calculator 141. At this time, the second remote control detector 121 uses a photographing angle APbase made by the screen of the TV 100 and a photographing direction of the camera 11. According to the present embodiment, the remote control direction angle APv is used as an example of a second remote control direction angle made by a direction perpendicular to a display and a direction obtained by projecting a remote control direction to another surface, and the second remote control detector 121 is provided as an example of a second remote control direction angle calculator that calculates the second remote control direction angle. An operation of the second remote control detector 121 will also be described in detail later. According to the present embodiment, the camera 11, the first remote control detector 120, and the second remote control detector 121 constitute a remote control direction detector.

The calibrator 122 previously calculates and sets the photographing angle APbase, which is used by the second remote control detector 121. According to the present embodiment, the calibrator 122 is provided as an example of a photographing angle calculator. An operation of the calibrator 122 will also be described in detail later.

The first pointing angle calculator 140 calculates a reference pointing angle A1$h$ based on the remote control direction angle APh and a remote control direction COMh, which is a horizontal component of a direction COM output by the remote controller 200, and outputs the reference pointing angle A1$h$ to the pointing angle update unit 150. An operation of the first pointing angle calculator 140 will also be described in detail later.

The second pointing angle calculator 141 calculates a reference pointing angle A1$v$ based on the remote control direction angle APv and a remote control direction COMv, which is a vertical component of the direction COM output by the remote controller 200, and outputs the reference pointing angle A1$v$ to the pointing angle update unit 150. An operation of the second pointing angle calculator 141 will also be described in detail later. According to the present embodiment, the first pointing angle calculator 140 and the second pointing angle calculator 141 may constitute a reference angle detector and a reference direction adjuster.

The pointing angle update unit 150 calculates a pointing angle A2 based on an angular velocity GYR output by the remote controller 200 and the reference pointing angle A1 obtained by synthesizing the reference pointing angle A1$h$ output by the first pointing angle calculator 140 with the reference pointing angle A1$v$ output by the second pointing angle calculator 141, and outputs the pointing angle A2 to the coordinate calculator 16. A current pointing angle A2 is basically updated with a new pointing angle A2 by accumulatively performing rotational transformation on the current pointing angle A2 based on the angular velocity GYR. The pointing angle update unit 150 performs a reset operation of replacing the value of the pointing angle A2 with the value of the reference pointing angle A1 at a predetermined timing. Thereafter, the pointing angle update unit 150 accumulatively repeats rotational transformation based on the angular velocity GYR to update the pointing angle A2. For example, the predetermined timing for performing the reset operation may be considered a timing at which a manipulating position of a user is changed. In this case, the change in the manipulating position of a user may be determined based on a change in an image position of the user on the camera picture PIC. However, the reset operation is not limited to this timing, and the reset operation may be regularly performed at intervals of a certain time. Even when the manipulating position of the user is changed by doing this, the pointing angle update unit 150 makes a direction of a center of a manipulating angle range of the remote controller 200 match with a direction in which the remote controller 200 faces the screen center PO. According to the present embodiment, the pointing angle update unit 150 is provided as an example of a pointing angle calculator that calculates a pointing angle.

The coordinate calculator 16 calculates a pointing coordinate position POS on the screen of the TV 100, based on the pointing angle A2 and outputs the pointing coordinate position POS to the display controller 17. According to the present embodiment, the coordinate calculator 16 is provided as an example of a position calculator that calculates a corresponding position on the display.

The display controller 17 generates a manipulating screen image DP by overlapping a menu screen image with a pointer based on the pointing coordinate position POS, and outputs the manipulating screen image DP to the display 18. According to the present embodiment, the coordinate calculator 16 and the display controller 17 constitute an example of a controller that controls a pointer to be displayed at a corresponding position on the display.

The display 18 displays the manipulating screen image DP on the screen of the TV 100. According to the present embodiment, the display 18 is provided as an example of display means that displays an image on a display screen.

The remote controller 200 includes an angular velocity sensor 21 and an acceleration sensor and magnetic sensor 220.

The angular velocity sensor 21 is, for example, a gyroscope that detects the angular velocity of a rotating object by detecting an inertial force applied to the rotating object. In this case, the angular velocity sensor 21 detects the angular velocity GYR of the remote controller 200 and outputs the angular velocity GYR to the pointing angle update unit 150.

The acceleration sensor and magnetic sensor 220 is a posture sensor including, for example, an acceleration sensor which detects an acceleration by detecting a change in an electrostatic capacity caused by a slight movement of a fine driver, and, for example, a magnetic sensor which detects a direction of terrestrial magnetism by using a magnetic sensor device. In this case, the acceleration sensor and magnetic sensor 220 detects the direction COM of the remote controller 200 based on a posture of the remote controller 200, outputs the remote control direction COMh, which is the horizontal component of the direction COM, to the first pointing angle calculator 140, and outputs the remote control direction COMv, which is the vertical component of the direction COM, to the second pointing angle calculator 141.

Figure 15A:
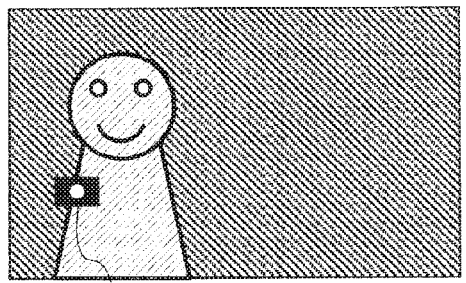
FIGS. 15(A), 15(B), and 15(C) explain an operation of a first remote control detector included in an image display apparatus according to the fourth embodiment of the present invention.
Figure 15B:
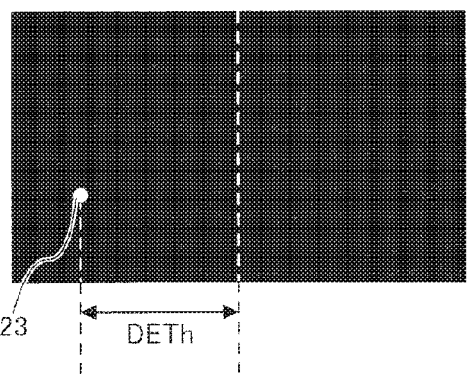
Figure 15C:
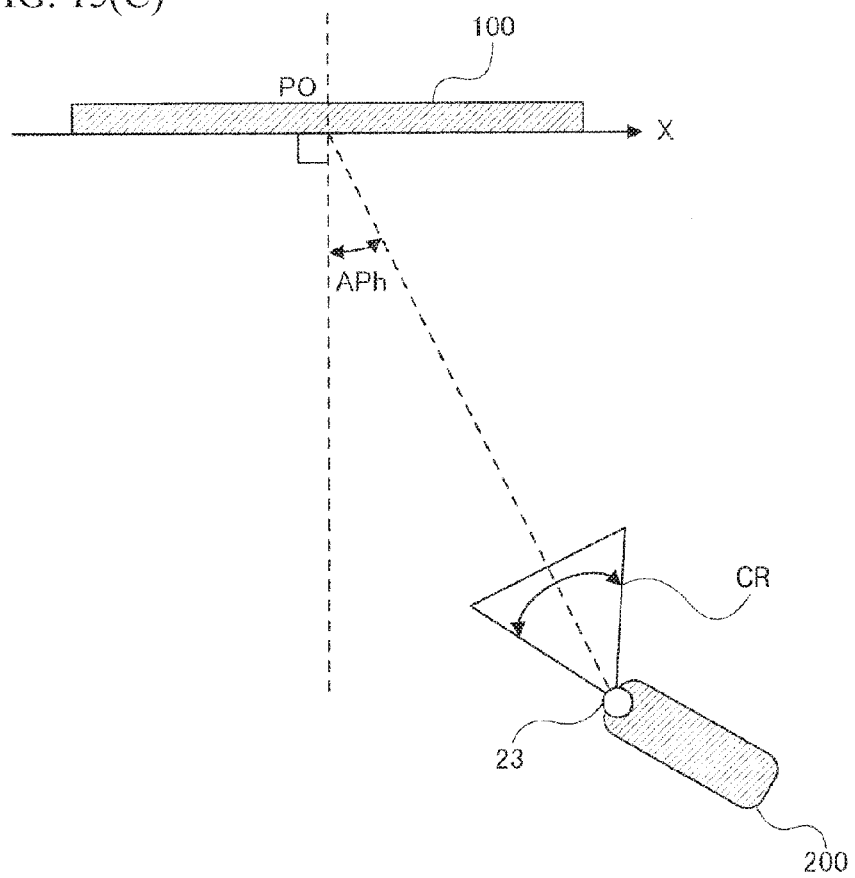

An operation of the first remote control detector 120 will now be described in detail. FIGS. 15A, 15B, and 15C explain an operation of the first remote control detector 120.

FIG. 15A illustrates a camera picture PIC. The first remote control detector 120 obtains a binary image as shown in FIG. 5B by binarizing the camera picture PIC to a predetermined threshold value. Accordingly, the first remote control detector 120 detects an area of the LED marker 23 and obtains a detection position DETh on an image of the LED marker 23 on the basis of the center of the image. FIG. 15C illustrates a relationship between positions of the TV 100 and the remote controller 200 as viewed from the top. FIG. 15C shows the remote controller 200 being in a direction rotated from a direction perpendicular to the screen of the TV 100 by the angle APh. Since a relationship between the detection position DETh on the image of the LED marker 23 and the remote control direction angle APh depends on the characteristics of the camera 11, the first remote control detector 120 calculates the remote control direction angle APh from the detection position DETh. In detail, the first remote control detector 120 calculates a remote control direction angle APh corresponding to a length from the center of the image to the detection position DETh by using the fact that a length from a left end of the image of FIG. 15B to a right end thereof corresponds to an angle of view.

Although it has been described above that an LED is detected based on brightness of the LED, the LED may be detected based on the color of the LED or detected based on a flickering pattern of the LED. A reflection marker may be used instead of the LED marker 23. One LED marker 23 or at least two LED markers 23 may be used, and the LED marker 23 may have various shapes.

Figure 16:
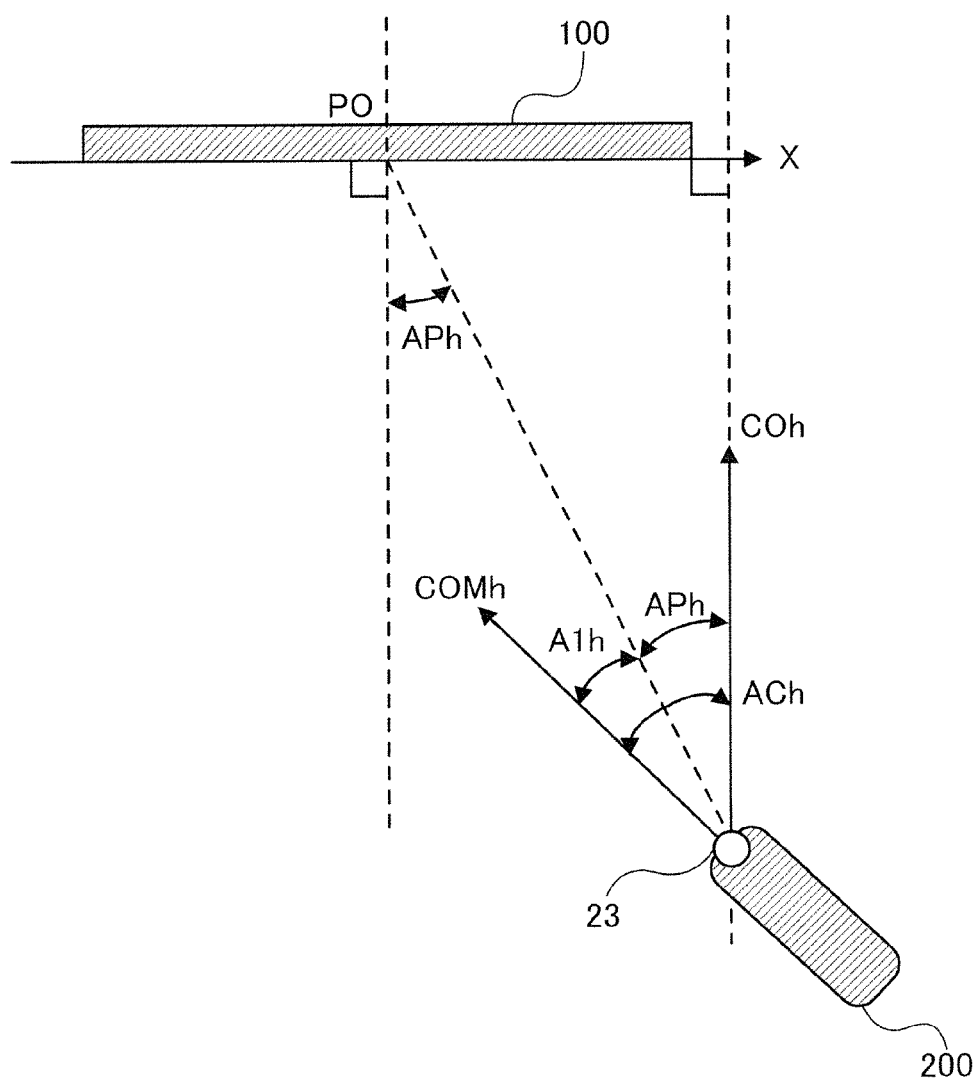
FIG. 16 explains an operation of a first pointing angle calculator included in the image display apparatus according to the fourth embodiment of the present invention.

An operation of the first pointing angle calculator 140 will now be described in detail. FIG. 16 illustrates a relationship between positions of the TV 100 and the remote controller 200 as viewed from the top, similar to FIG. 15C. The manipulating angle range is omitted in the drawings for the sake of brevity. In FIG. 16, a vector COMh is a remote control direction output by the acceleration sensor and magnetic sensor 220. A vector COh is a reference direction perpendicular to the screen of the TV 100. Similar to FIG. 15C, a remote control direction angle as viewed from the TV 100 is APh.

In FIG. 16, a direction in which the remote controller 200 faces the screen center PO of the TV 100 is a direction of the center of the manipulating angle range of the remote controller 200. To this end, a direction obtained by rotating the reference direction COh by the angle APh may be the direction of the center of the manipulating angle range of the remote controller 200. When the remote controller 200 is directed in the direction obtained by rotating the reference direction COh by the angle APh, the remote controller 200 points at the screen center PO. Thus, the first pointing angle calculator 140 calculates an angle ACh made by the remote control direction COMh and the reference direction COh, and calculates the reference pointing angle A1h made by a direction connecting the remote controller 200 to the screen center PO and the remote control direction COMh by subtracting the angle APh from the angle ACh.

The vector COh may be previously set by disposing the remote controller 200 in a direction perpendicular to the screen of the TV 100 after driving the TV 100, and by, at this time, reading the value of the remote control direction COMh output by the acceleration sensor and magnetic sensor 220. Alternatively, instead of manually setting the vector COh after driving the TV 100, the vector COh may be automatically set in advance by, for example, providing a direction sensor in the TV 100. Although it has been described above that the vector COh is the direction perpendicular to the screen of the TV 100, the vector COh may be any direction, such as a direction parallel to the screen of the TV 100, as long as it serves as a basis direction.

Figure 17A:
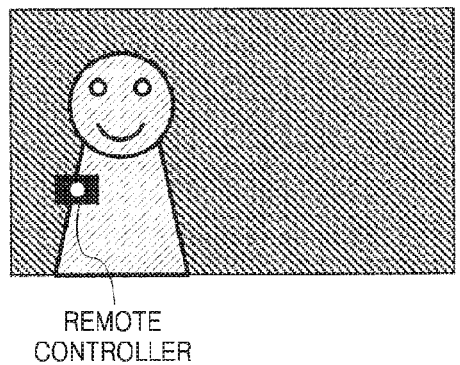
FIGS. 17(A), 17(B), and 17(C) explain an operation of a second remote control detector included in the image display apparatus according to the fourth embodiment of the present invention.
Figure 17B:
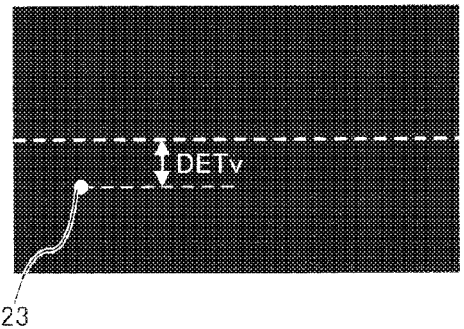
Figure 17C:
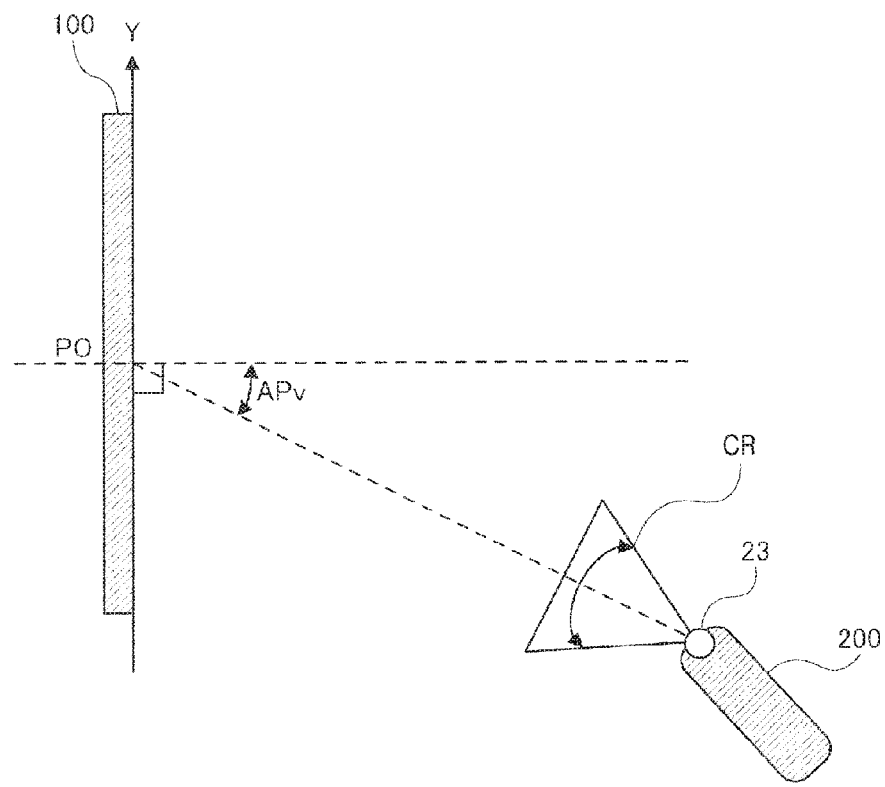

An operation of the second remote control detector 121 will now be described in detail. Although the first remote control detector 120 performs processing with respect to a horizontal direction as described above, the second remote control detector 121 performs processing with respect to a vertical direction. FIGS. 17A, 17B, and 17C explain an operation of the second remote control detector 121.

FIG. 17A illustrates a camera picture PIC. The second remote control detector 121 obtains a binary image as shown in FIG. 17B by binarizing the camera picture PIC to a predetermined threshold value. Accordingly, the second remote control detector 121 detects an area of the LED marker 23 and obtains a detection position DETv on an image of the LED marker 23 on the basis of the center of the image. FIG. 17C illustrates a relationship between positions of the TV 100 and the remote controller 200 as viewed from the lateral side. FIG. 17C shows the remote controller 200 being in a direction rotated from a direction perpendicular to the screen of the TV 100 by the angle APv. Since a relationship between the detection position DETv on the image of the LED marker 23 and the remote control direction angle APv depends on the characteristics of the camera 11, the second remote control detector 121 calculates the remote control direction angle APv from the detection position DETv. In detail, the second remote control detector 121 calculates a remote control direction angle APv corresponding to a length from the center of the image to the detection position DETv by using the fact that a length from an upper end of the image of FIG. 17B to a lower end thereof corresponds to an angle of view.

Although the first remote control detector 120 is based on the premise that the camera 11 is mounted on a center of the screen in the horizontal direction, the second remote control detector 121 is based on the premise that the camera 11 is mounted on a center of the screen not only in the horizontal direction but also in the vertical direction. However, since the camera 11 is mounted on the screen center PO, the camera 11 is mounted on an upper or lower frame of the TV 100, and accordingly an operation of the second remote control detector 121 needs to be corrected.

Thus, according to the present embodiment, the camera 11 is mounted on the center of the upper frame of the TV 100. FIG. 1 also illustrates the camera 11 mounted on the upper frame of the TV 100.

Figure 18:
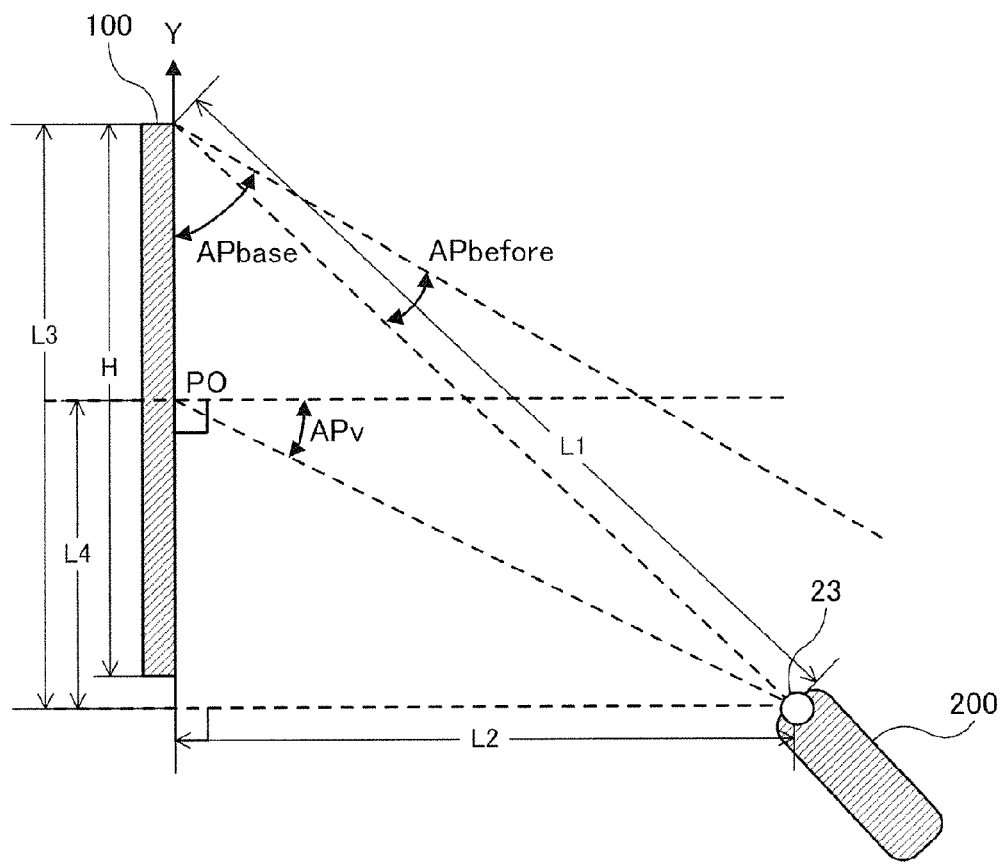
FIG. 18 explains an operation of a second remote control detector when a camera is mounted on the top of the image display apparatus according to the fourth embodiment of the present invention.

An operation of the second remote control detector 121 when the camera 11 is mounted on the top of the TV 100 will be described in detail. FIG. 18 illustrates a relationship between positions of the TV 100 and the remote controller 200 as viewed from the lateral side. FIG. 18 shows the remote controller 200 being in a direction rotated from a direction perpendicular to the screen of the TV 100 by the angle APv. The manipulating angle range is omitted in the drawings for the sake of brevity. In FIG. 17C, the second remote control detector 121 obtains the remote control direction angle APv from the detection position DETv, based on only the relationship between the detection position DETv and the remote control direction angle APv determined according to the characteristics of the camera 11. However, when the camera 11 is mounted on the top of the TV 100, the following correction is needed to obtain the remote control direction angle APv from the detection position DETv.

In other words, first, the second remote control detector 121 obtains a distance L1 from the camera 11 to the remote controller 200. For example, since an area S of the LED marker 23 on the camera picture PIC is inversely proportional to a square of the distance L1, the relationship between the area S and the distance L1 is stored in a lookup table, and the distance L1 is obtained from the lookup table. Alternatively, if two LED markers 23 are provided in the remote controller 200, since a distance D between the two LED markers 23 on the camera picture PIC is inversely proportional to the distance L1, the relationship between the distance D and the distance L1 is stored in a lookup table, and the distance L1 is obtained from the lookup table.

Next, the second remote control detector 121 calculates a distance L2 from the remote controller 200 to the TV 100, according to 「L2=L1×sin(APbase−APbefore)」, where APbase is an angle made by a photographing direction of the camera 11 and the screen (hereinafter, referred to as 「photographing angle」). According to the present embodiment, since the camera 11 is mounted on the top of the TV 100, the photographing angle is an angle at which the camera 11 is directed down. When the camera 11 is mounted on the bottom of the TV 100, the photographing angle is an angle at which the camera 11 is directed up. In addition, APbefore is an angle formed by the photographing direction of the camera 11 and a direction from the camera 11 to the remote controller 200 (i.e., a photographing remote control angle), and is obtained from the detection position DETv on the camera picture PIC.

The second remote control detector 121 calculates a distance L3 from a foot of the perpendicular from the remote controller 200 to the TV 100 and the camera 11, according to ⌜L3=L1×cos(APbase−APbefore)⌟.

Next, the second remote control detector 121 calculates a distance L4 from the foot of the perpendicular from the remote controller 200 to the TV 100 and a center PO of the screen of the TV 100, according to ⌜L4=L3−H/2⌟, where H is a height of the TV 100.

Accordingly, the second remote control detector 121 obtains the remote control direction angle APv according to ⌜APv=arctan(L4/L2)⌟.

Figure 19:
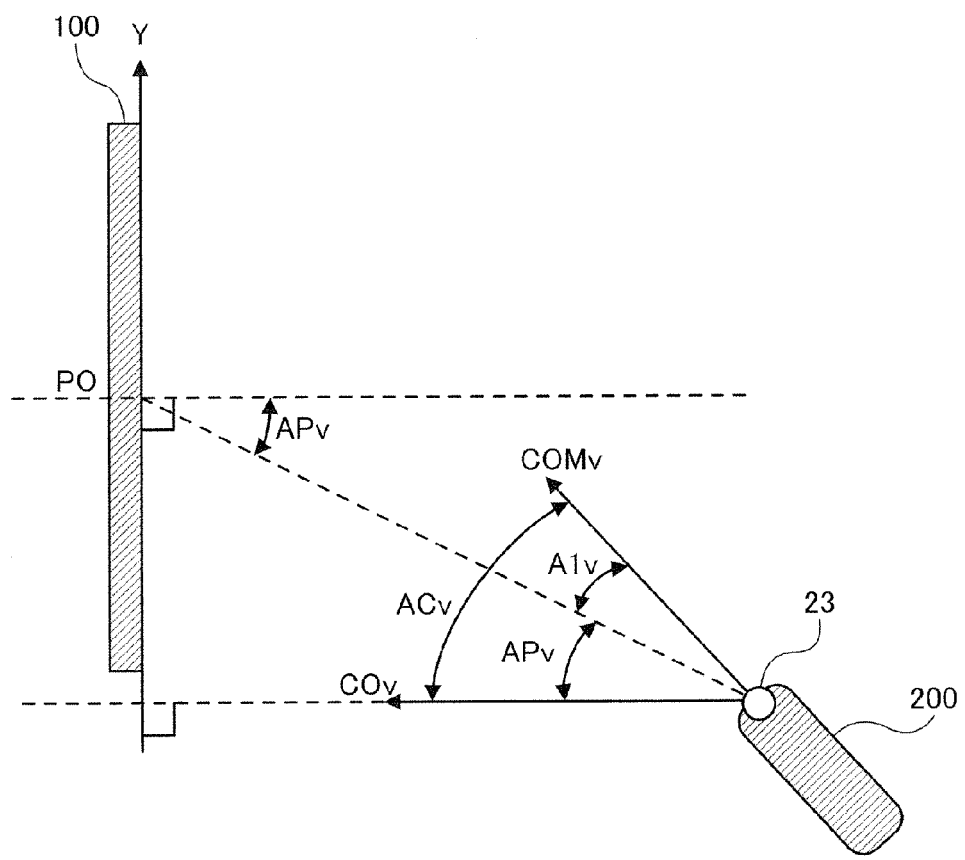
FIG. 19 explains an operation of a second pointing angle calculator included in the image display apparatus according to the fourth embodiment of the present invention.

An operation of the second pointing angle calculator 141 will now be described in detail. FIG. 19 illustrates a relationship between positions of the TV 100 and the remote controller 200 as viewed from the lateral side, similar to FIG. 17C. The manipulating angle range is omitted in the drawings for the sake of brevity. In FIG. 19, a vector COMv is a remote control direction output by the acceleration sensor and magnetic sensor 220. A vector COv is a reference direction perpendicular to the screen of the TV 100. Similar to FIG. 17C, a remote control direction angle as viewed from the TV 100 is APv.

In FIG. 19, a direction in which the remote controller 200 faces the screen center PO of the TV 100 is a direction of the center of the manipulating angle range of the remote controller 200. To this end, a direction obtained by rotating the reference direction COh by the angle APv may be the direction of the center of the manipulating angle range of the remote controller 200. When the remote controller 200 is directed in the direction obtained by rotating the reference direction COh by the angle APv, the remote controller 200 points at the screen center PO. Thus, the second pointing angle calculator 141 calculates an angle ACv made by the remote control direction COMv and the reference direction COh, and calculates the reference pointing angle A1v made by a direction connecting the remote controller 200 to the screen center PO and the remote control direction COMv by subtracting the angle APv from the angle ACv.

The vector COv may be previously set by disposing the remote controller 200 in a direction perpendicular to the screen of the TV 100 after driving the TV 100, and by, at this time, reading the value of the remote control direction COMv output by the acceleration sensor and magnetic sensor 220. Alternatively, instead of manually setting the vector COv after driving the TV 100, the vector COv may be automatically set in advance by, for example, providing a direction sensor in the TV 100. Although it has been described above that the vector COv is the direction perpendicular to the screen of the TV 100, the vector COv may be any direction, such as a direction parallel to the screen of the TV 100, as long as it serves as a basis direction.

Figure 20:
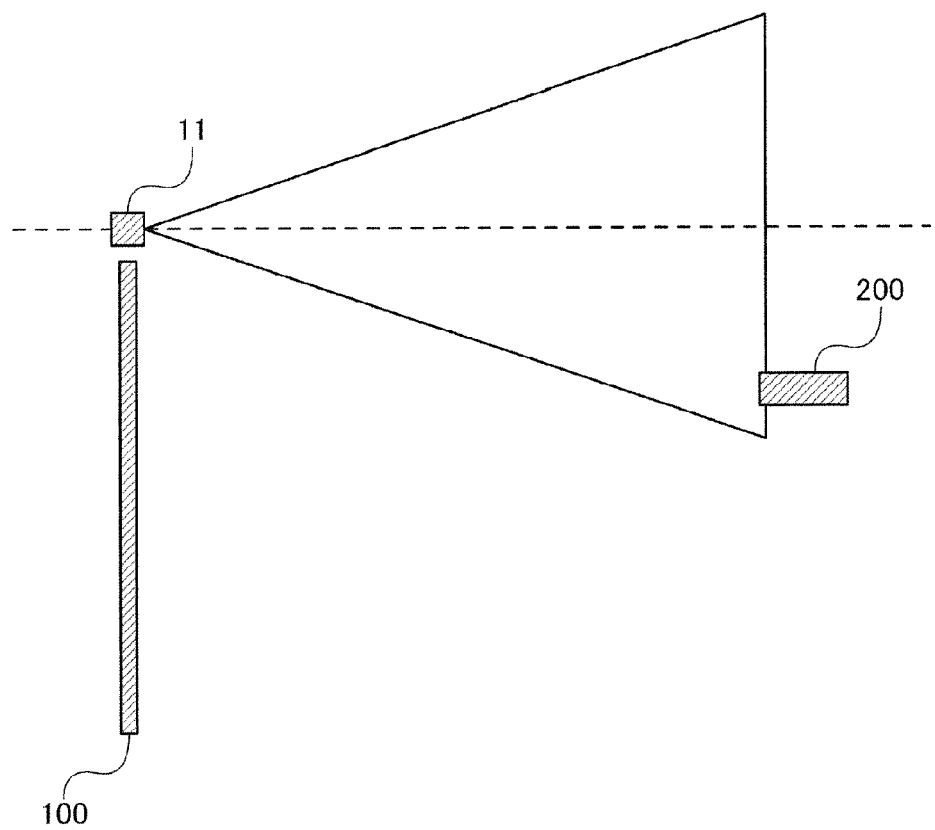
FIGS. 20-22 explain an operation of a calibrator included in the image display apparatus according to the fourth embodiment of the present invention.
Figure 21:
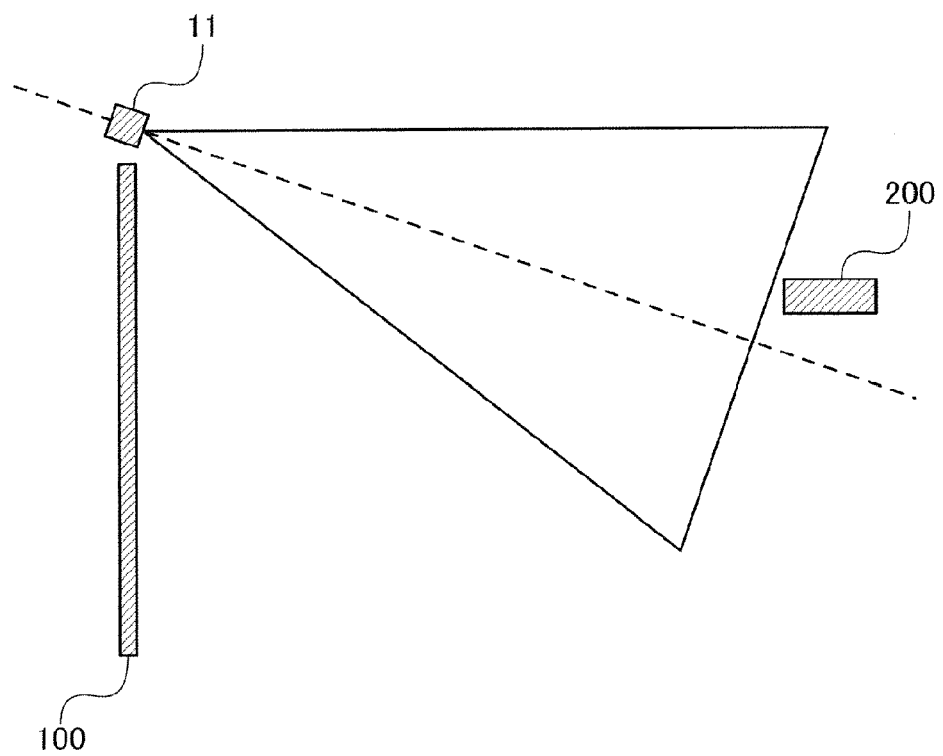
Figure 22:
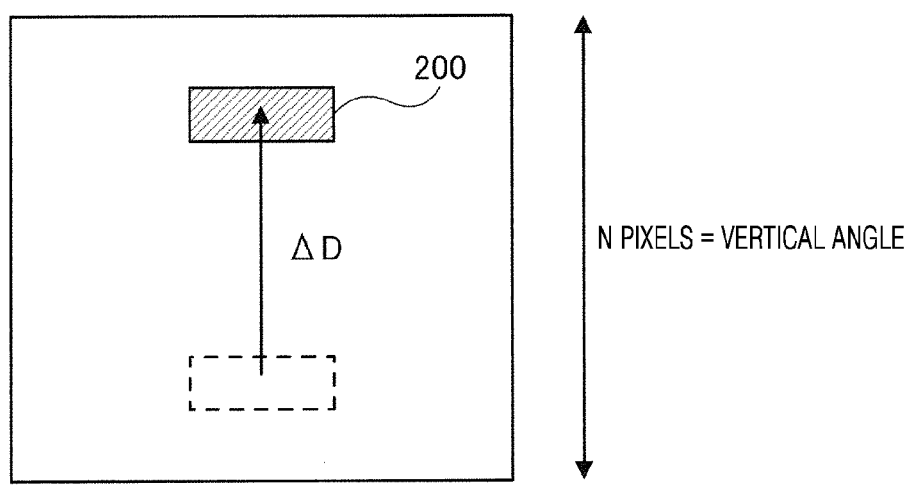

An operation of the calibrator 122 will now be described in detail. In other words, a method of calculating a photographing inclination angle of the camera 11 will now be described. First, as shown in FIG. 20, when the camera 11 is mounted on the upper frame of the TV 100 such that a photographing direction of the camera 11 is leveled with the ground, the calibrator 122 stores a vertical position of the remote controller 200 within the field of vision of the camera 11. Next, as shown in FIG. 21, when the camera 11 is adjusted to have a desired photographing angle, the calibrator 122 again stores a vertical position of the remote controller 200 within the field of vision of the camera 11. Accordingly, the calibrator 122 sets the photographing angle of the camera 11 as ⌜θ×ΔD/N⌟ by using a vertical angle of view (θ) of the camera 11 and a movement amount ΔD of the remote controller 200 on an image as shown in FIG. 22. Here, N indicates the number of pixels corresponding to the vertical angle of view. The vertical angle of view may be calculated from the size of an image sensor and a focal length of the camera 11 or may be obtained from an experimental value. The experimental value is a result of experimentally measuring the vertical angle of view by using the camera 11, and the calibrator 122 may be configured to store the experimental value.

Although a method of calculating the photographing angle of the camera 11 by using the movement amount (ΔD) of the remote controller 200 on the image has been described above, the photographing angle of the camera 11 may be calculated using a movement amount of the background on the image. The calibrator 122 stores a background image captured when the camera 11 is leveled with the ground, and compares the photographing angle of the camera 11 with a calibrated background image to thereby obtain a movement amount (ΔD) of the background image. Similarly, the calibrator 122 may calculate the photographing angle of the camera 11.

Alternatively, an angle measuring sensor called as an encoder may be used. The encoder may be mounted on an angle adjustment unit of the camera 11 and thus may directly measure an angle.

Although it has been described above that the camera 11 and the LED marker 23 are respectively a visible light camera and a visible LED, embodiments are not limited thereto. For example, the camera 11 and the LED marker 23 may be respectively an infrared light camera and an infrared LED.

Figure 23:
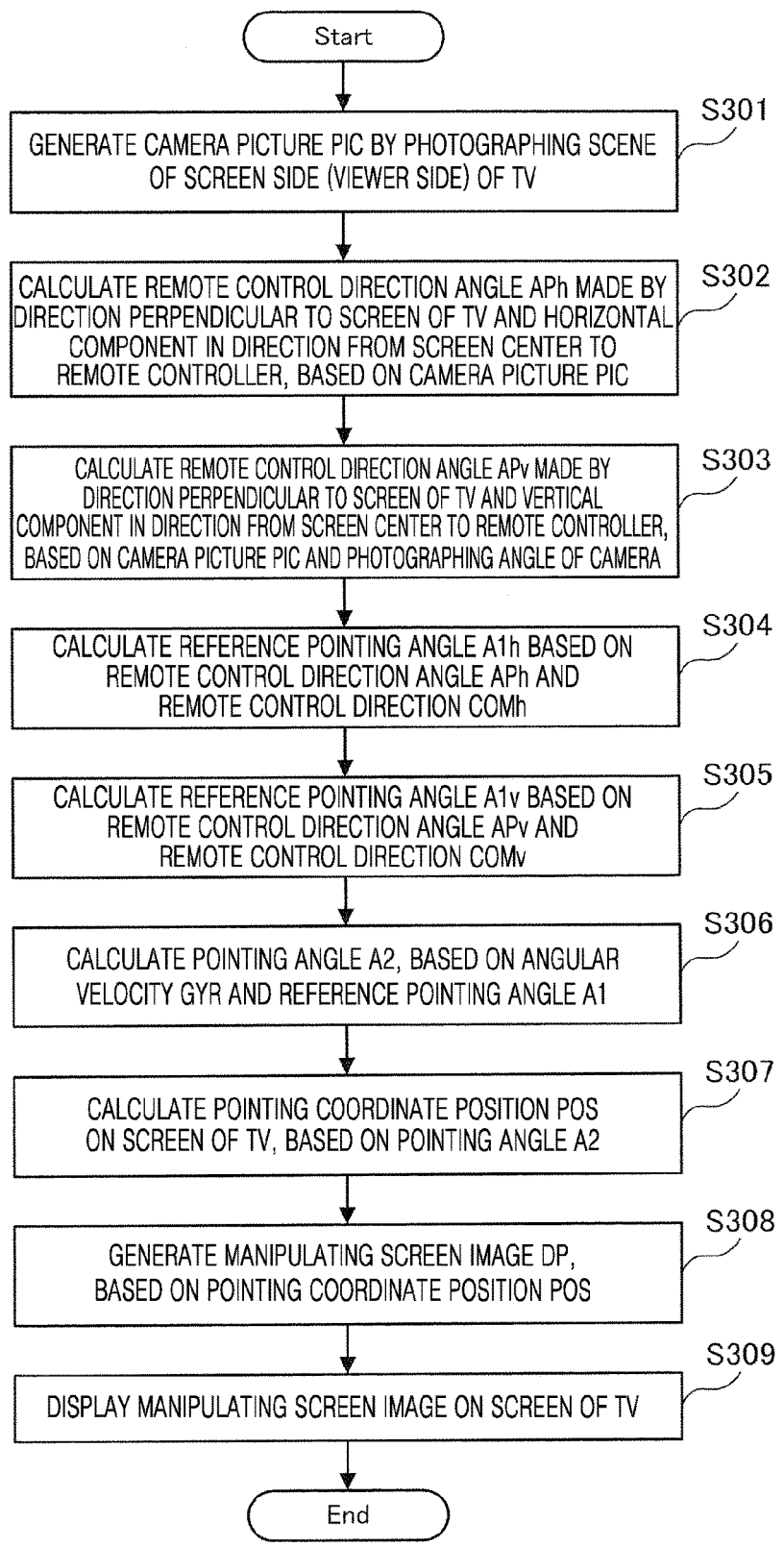
FIG. 23 is a flowchart of an overall operation of the image display apparatus according to the fourth embodiment of the present invention.

An overall operation of the TV 100 according to the fourth embodiment will now be described in detail. FIG. 23 is a flowchart of an example of an overall operation of the TV 100.

As shown in FIG. 23, the TV 100 generates a camera picture PIC by photographing a scene of a screen side (viewer side) of the TV 100 by using the camera 11, in operation 301. Then, in operation 302, the first remote control detector 120 calculates a remote control direction angle APh made by a direction perpendicular to the screen of the TV 100 and a horizontal component in a direction from the screen center PO to the remote controller 200, based on the camera picture PIC generated in operation 301. In operation 303, the second remote control detector 121 calculates a remote control direction angle APv made by the direction perpendicular to the screen of the TV 100 and a vertical component in the direction from the screen center PO to the remote controller 200, based on the camera picture PIC generated in operation 301 and a photographing angle made by the screen of the TV 100 and a photographing direction of the camera 11.

Next, in operation 304, the first pointing angle calculator 140 calculates a reference pointing angle A1h based on the remote control direction angle APh calculated in operation 302 and a remote control direction COMh, which is a horizontal component of a pointing direction output by the remote controller 200. In operation 305, the second pointing angle calculator 141 calculates a reference pointing angle A1v based on the remote control direction angle APv calculated in operation 303 and a remote control direction COMv, which is a vertical component of the pointing direction output by the remote controller 200. Then, in operation 306, the pointing angle update unit 150 calculates a pointing angle A2, based on an angular velocity GYR output by the remote controller 200 and the reference pointing angle A1 obtained by synthesizing the reference pointing angle A1h calculated in operation 304 with the reference pointing angle A1v calculated in operation 305.

Then, in operation 307, the coordinate calculator 16 calculates a pointing coordinate position POS on the screen of the TV 100, based on a pointing angle A2. Then, in operation 308, the display controller 17 generates a manipulating screen image DP by overlapping a menu screen image with a pointer based on the pointing coordinate position POS calculated in operation 307. The display 18 displays the manipulating screen image DP generated in operation 308 on the screen of the TV 100.

According to the present embodiment, the camera 11 is mounted on the upper or lower frame of the TV 100, the first remote control detector 120 and the first pointing angle calculator 140 perform processing on a horizontal plane, and the second remote control detector 121 and the second pointing angle calculator 141 perform processing on a vertical plane perpendicular to the screen of the TV 100. However, the camera 11 may be mounted on a left or right frame of the TV 100, the first remote control detector 120 and the first pointing angle calculator 140 may perform processing on the vertical plane perpendicular to the screen of the TV 100, and the second remote control detector 121 and the second pointing angle calculator 141 perform processing on the horizontal plane. The case where the camera 11 is mounted on the upper or lower frame of the TV 100 is an example in which the horizontal surface is one surface and the vertical plane perpendicular to the screen of the TV 100 is another surface, whereas the case where the camera 11 is mounted on the left or right frame of the TV 100 is an example in which the vertical plane perpendicular to the screen of the TV 100 is a surface and the horizontal surface is another surface.

According to the present embodiment, the camera 11 is mounted on a frame center of the TV 100. The frame center is ideally the center of a frame, but is not necessarily the center of a frame because a deviation of a mounted position of the camera 11 from the frame center on the camera picture PIC generated by the camera 11 photographing a viewer side may be corrected.

According to the present embodiment, the distance L1 between the camera 11 and the remote controller 200 is measured based on the area S of the LED marker 23 or the distance between LED markers 23 on the camera picture PIC. However, another method may be used.

For example, a method of using a stereo camera may be used. In general, a stereo camera is able to obtain depth information (distance) to a target object by using time difference information of two horizontally- or vertically-aligned cameras. The stereo camera is able to obtain a distance image representing a distance to an object in front of the camera. For example, if the camera 11 is provided on an upper edge center of the TV 100, a camera 110 is further mounted on a lower edge center thereof, thereby constructing a stereo camera. Since the coordinate of the remote controller 200 is already ascertained from the camera picture PIC captured by the camera 11, the distance L1 between the camera 11 and the remote controller 200 may be measured by referring to data of a coordinate on a distance image that is the same as the already-ascertained coordinate.

Alternatively, a method of using a distance image sensor may be used. Since the distance image sensor is to obtain a distance image, the distance L1 between the camera 11 and the remote controller 200 may be measured similarly. Examples of the distance image sensor include a time of flight (TOF) type distance image sensor using an arrival time difference of light, and a structured light type distance image sensor that radiating infrared light having a specific pattern and calculates a distance to an object based on a distortion of the pattern.

Alternatively, a method of using ultrasound waves may be used. By including an ultrasonic transmitter in the remote controller 200 and two ultrasonic receivers at different locations on the TV 100 and sending ultrasonic waves from the ultrasonic transmitter of the remote controller 200, the distance L1 between the camera 11 and the remote controller 200 may be measured from a triangulation principle, based on a phase difference between ultrasonic waveforms received from the two ultrasonic receivers and an interval between the two ultrasonic receivers. At least 3 ultrasonic receivers may be included. In this case, precise measurement is possible.

Alternatively, a method of using radio waves may be used. Similar to the case of using ultrasonic waves, by including a radio wave transmitter in the remote controller 200 and two radio wave receivers at different locations on the TV 100 and sending radio waves from the remote controller 200, the distance L1 between the camera 11 and the remote controller 200 may be measured from a triangulation principle, based on a phase difference between radio waveforms received from the two radio wave receivers. At least 3 radio wave receivers may be included. In this case, precise measurement is possible.

Although it has been described above that the image display system according to the fourth embodiment has a structure based on the first embodiment, the image display system according to the fourth embodiment may have a structure based on the second embodiment or the third embodiment. In other words, similar to the second embodiment, the image display system according to the fourth embodiment may be constructed such that the pointing angle update unit 150 may acquire the remote control direction angle APh and the remote control direction angle APv from the first remote control detector 120 and the second remote control detector 121. Similar to the third embodiment, the image display system according to the fourth embodiment may be constructed such that the angular velocity sensor 21 is not provided.

Figure 24:
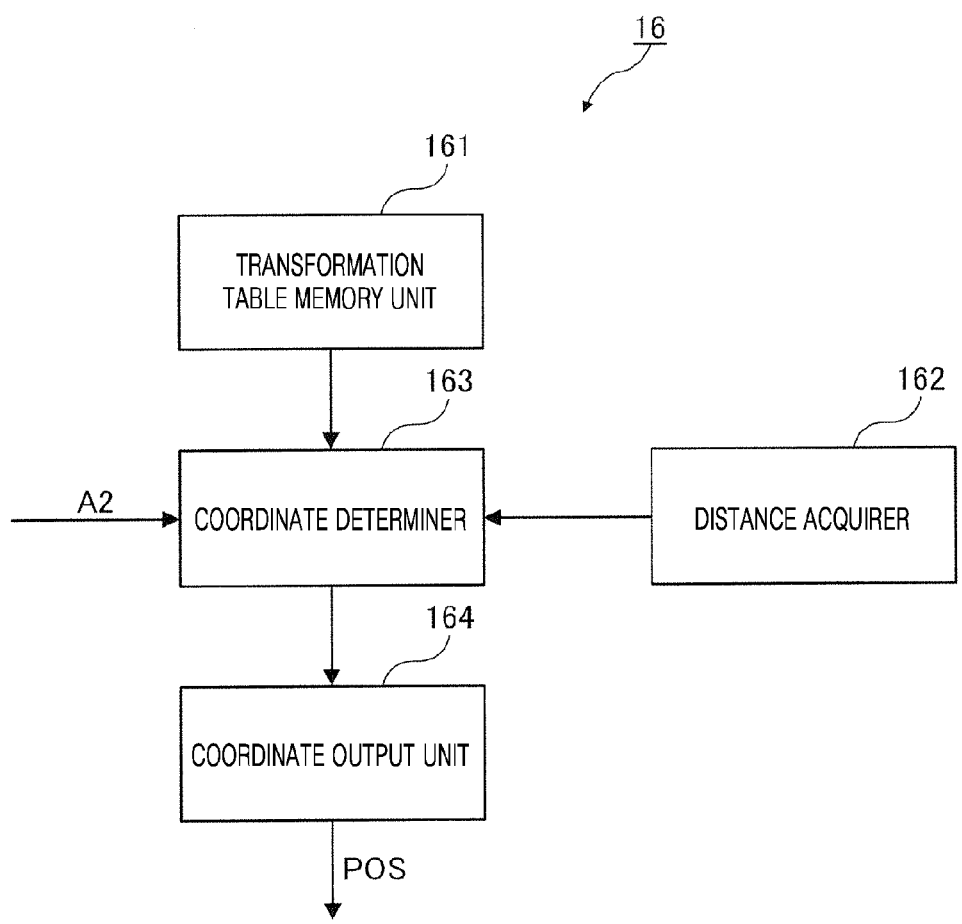
FIG. 24 is a block diagram of a position calculator according to the first through fourth embodiments of the present invention.

FIG. 24 illustrates a functional structure of the coordinate calculator 16 of the image display apparatus 100, according to an embodiment of the present invention. In other words, the embodiment of FIG. 24 corresponds to the coordinate calculator 16 according to each of the first through fourth embodiments.

Referring to FIG. 24, the coordinate calculator 16 includes a transformation table memory unit 161, a distance acquirer 162, a coordinate determiner 163, and a coordinate output unit 164.

The transformation table memory unit 161 stores a transformation table which is referred to when the pointing angle A2 is transformed into the pointing coordinate position POS. The transformation table defines what angle the pointing angle A2 is to calculate the pointing coordinate position POS and what coordinate position is calculated as the pointing coordinate position POS. Although one transformation table may be stored, the transformation table memory unit 161 according to the fifth embodiment stores a plurality of transformation tables in correspondence with a distance from the TV 100 to the remote controller 200. For example, the transformation table memory unit 161 according to the fifth embodiment stores a long-distance transformation table corresponding to a case where the distance from the TV 100 to the remote controller 200 is equal to or greater than DR, and a short-distance transformation table corresponding to a case where the distance from the TV 100 to the remote controller 200 is less than or equal to DR.

The distance acquirer 162 acquires the distance from the TV 100 to the remote controller 200. According to the first through third embodiments, when the remote control direction angle calculator 12 calculates the remote control direction angle AP, the remote control direction angle calculator 12 may also calculate a distance from the camera 11 to the remote controller 200 according to the same method as that performed by the second remote control detector 121 according to the fourth embodiment. Thus, the distance may be acquired as the distance from the TV 100 to the remote controller 200. According to the fourth embodiment, the second remote control detector 121 calculates the distance L1 from the camera 11 to the remote controller 200. Thus, the distance L1 may be acquired as the distance from the TV 100 to the remote controller 200. Alternatively, instead that the distance from the camera 11 to the remote controller 200 is acquired as the distance from the TV 100 to the remote controller 200, a distance from the screen center PO to the remote controller 200 may be calculated based on the distance from the camera 11 to the remote controller 200 and may be acquired as the distance from the TV 100 to the remote controller 200.

The coordinate determiner 163 reads a corresponding transformation table from the transformation table memory unit 161 according to the distance acquired by the distance acquirer 162. The coordinate determiner 163 determines the pointing coordinate position POS corresponding to the pointing angle A2, by using the transformation table. For example, when the distance acquired by the distance acquirer 162 is equal to or greater than DR, the coordinate determiner 163 determines the pointing coordinate position POS by using the long-distance transformation table, and, when the distance acquired by the distance acquirer 162 is less than or equal to DR, the coordinate determiner 163 determines the pointing coordinate position POS by using the short-distance transformation table.

The coordinate output unit 164 outputs the pointing coordinate position POS determined by the coordinate determiner 163 to the display controller 17.

Figure 25:
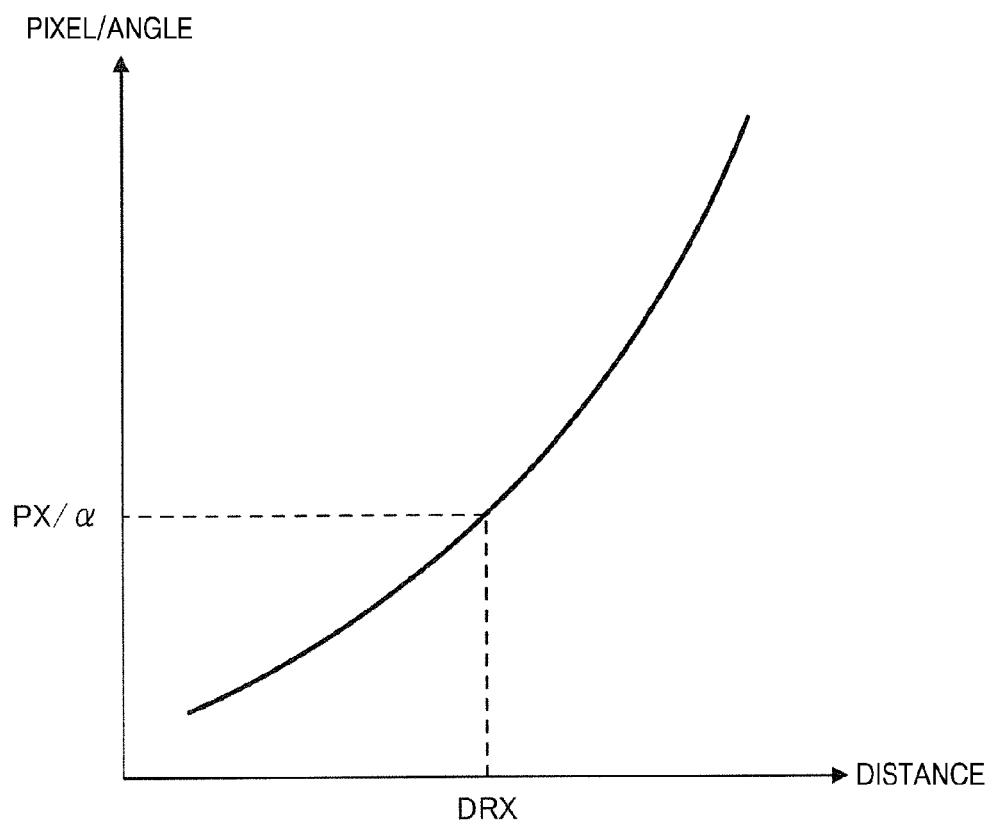
FIG. 25 is a graph showing a transformation rule when a transformation rule from a pointing angle to a pointing coordinate position consecutively changes according to a distance from an image display apparatus to a remote controller.

However, it has been described above that the coordinate determiner 163 selects one from the plurality of transformation tables stored in the transformation table memory unit 161 according to the distance acquired by the distance acquirer 162, and transforms the pointing angle A2 into the pointing coordinate position POS by using the selected transformation table. In other words, a transformation rule from the pointing angle A2 to the pointing coordinate position POS varies in stages according to the distance from the TV 100 to the remote controller 200. However, this transformation rule may be consecutively changed. FIG. 25 is a graph showing a transformation rule that changes consecutively. In the graph of FIG. 25, the horizontal axis indicates a distance from the TV 100 to the remote controller 200, and the vertical axis indicates the number of pixels (corresponding to a distance) existing from the screen center PO to the pointing coordinate position POS per unit angle of the pointing angle A2. For example, the distance acquired by the distance acquirer 162 is referred to as DRX. Then, as shown in FIG. 25, the coordinate determiner 163 acquires PX/$\alpha$ representing that the number of pixels per unit angle $\alpha$ is PX. The coordinate determiner 163 calculates the pointing coordinate position POS, based on the number of pixels obtained by multiplying (PX/$\alpha$) by the pointing angle A2.

Other embodiments will now be described.

Figure 26:
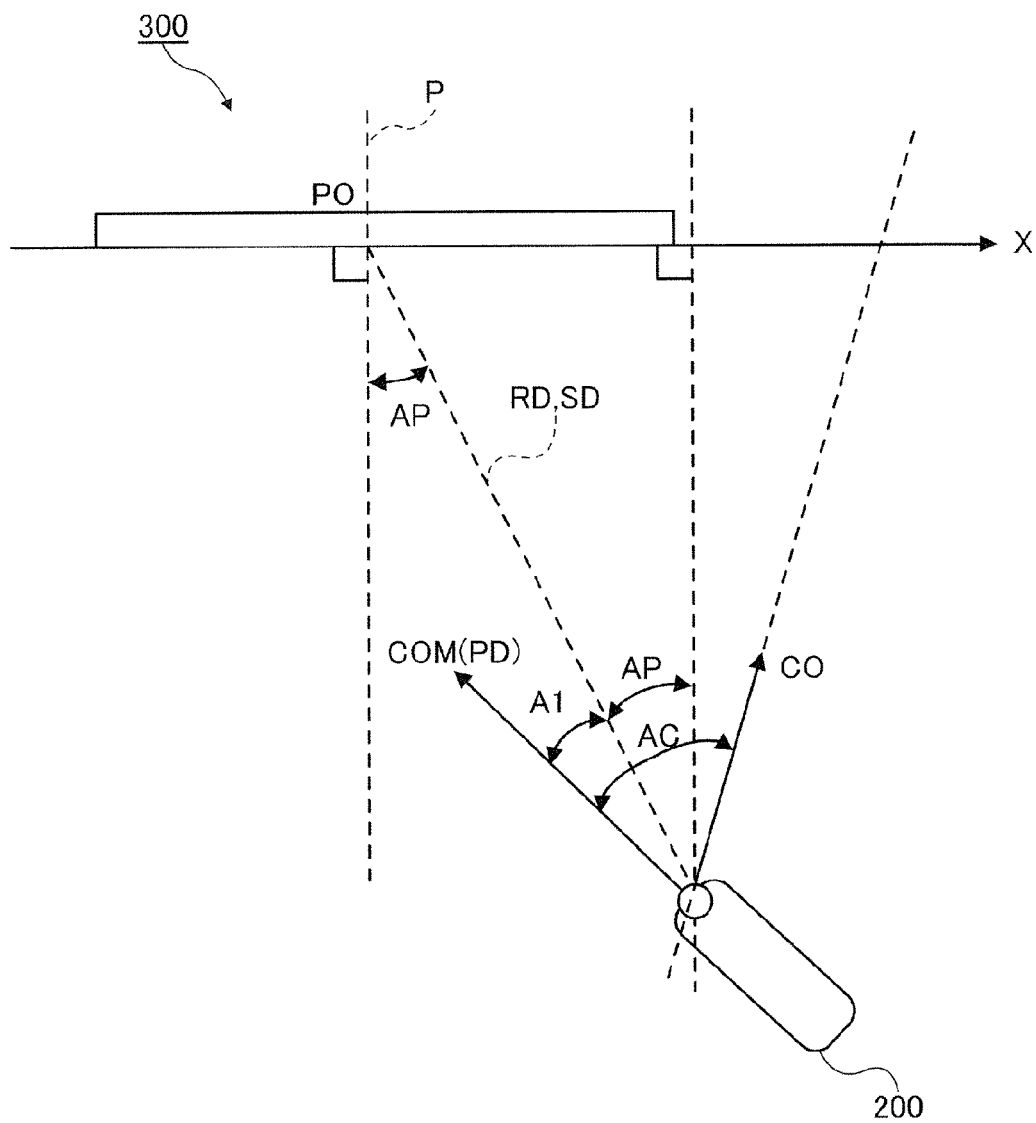
FIG. 26 explains a method of setting a reference direction according to other embodiments of the present invention.

According to the first embodiment, a reference direction is set to be perpendicular to the screen of a TV. However, for example, as shown in FIG. 26, the reference direction may be set to be tilt with respect to the screen of the TV. Even in this case, a reference pointing angle may be calculated as long as an angle of inclination of the reference direction with respect to the TV screen is already known, and a standard direction may be adjusted. The reference direction may be set to be parallel to the TV screen.

Figure 27:
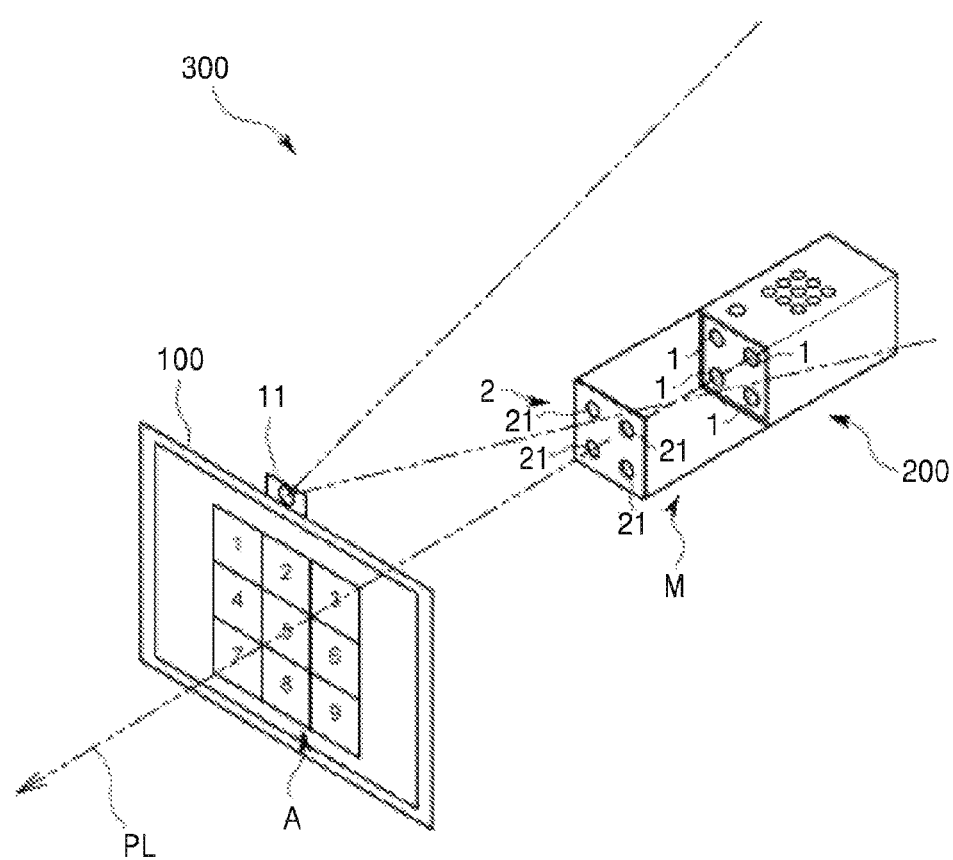
FIG. 27 illustrates an overall structure of an image display system according to a fifth embodiment of the present invention.

FIG. 27 illustrates an overall structure of an image display system 300 according to a fifth embodiment of the present invention.

As shown in FIG. 27, the image display system 300 includes a TV 100 that is to be pointed, a camera 11 provided on the TV 100, and a remote controller 200 for manipulating the TV 100, and is used by a user to point at an arbitrary point on the TV screen via the remote controller 200.

In more detail, the image display system 300 includes motion sensors, namely, an acceleration sensor 32 and an angular velocity sensor 33, within the remote controller 200, and measures a change in a pointing direction PL (virtual pointing straight line) of the remote controller 200 by using the motion sensors. The image display system 300 displays and moves an object on a point on the TV screen that is estimated to be currently pointed by the current remote controller 200 from a measured value.

Although the image display system 300 according to the present embodiment operates based on a relative pointing method, a reference posture of the remote controller 200 that is a basis for estimation of a pointing position is automatically calibrated, and a user does not need to perform a particular operation to initiate the calibration.

Each component of the image display system 300 according to the present embodiment will now be described with reference to a function block diagram of FIG. 28. Components that perform intrinsic functions of the TV 100 and the remote controller 200 will not be described.

The image display system 300 physically includes the remote controller 200, the camera 11, and a computing apparatus E included in the TV 100. The computing apparatus E estimates a pointing position according to a movement and posture change of the remote controller 200 that are measured by the remote controller 200, and moves and displays a position of a cursor that is an object displayed on the TV screen. The computing apparatus E calibrates the reference posture of the remote controller 200 that is a basis for estimation of the pointing position, according to an image captured by the camera 11.

Each component of the image display system 300 will now be described in detail. The remote controller 200 includes a posture variation measurer 30 measuring a posture variation, and also includes, on a leading end thereof, a marker unit M serving as a marker when the camera 11 photographs the remote controller 200. The posture variation measurer 30 includes a magnetic sensor 31, and the motion sensors, namely, the acceleration sensor 32 and the angular velocity sensor 33. The remote controller 200 has a roughly thin rectangular shape, and includes manipulating buttons for use in channel selection and the like arranged on one side surface of the remote controller 200. A direction in which a leading surface faces is detected as the pointing direction PL by each sensor.

The magnetic sensor 31 detects a direction in which the remote controller 200 points within a horizontal plane, according to terrestrial magnetism. According to the present embodiment, the direction detected by the magnetic sensor 31 is acquired as a basis for detecting rotation within the horizontal plane. A posture change when a user has changed the pointing direction PL of the remote controller 200 is not measured by the magnetic sensor 31 but by the motion sensors having a high time resolving capability.

The acceleration sensor 32 measures an acceleration when the remote controller 200 has been operated by a user. The acceleration is used to compensate for an angular velocity measured by the angular velocity sensor 33.

When a center axis passing through both end surfaces of the remote controller 200 is defined as a roll axis, an axis perpendicular to an opposite side surface having no manipulating buttons arranged thereon is defined as a pitch axis (horizontal axis), and an axis perpendicular to the side surface having the manipulating buttons arranged thereon is defined as a yawing axis (vertical axis), the angular velocity sensor 33 measures an angular velocity (pitching) in a direction of the pitch axis and an angular velocity in a direction of the yawing axis. In other words, the angular velocity sensor 33 includes two detectors to detect the angular velocities in the directions of the pitch axis and the yawing axis.

The marker unit M corresponds to four light sources accommodated within the internal space of the roughly rectangular shape on the leading end of the remote controller 200, and is formed of a light-shielding body 2 including a plurality of LEDs 1 emitting different colors and a plurality of apertures 21, the number of which is the same as that of apertures 21.

The four LEDs 1 are arranged to form a rough square as viewed in a direction perpendicular to a leading end surface of the remote controller 200. According to the present embodiment, the four color LEDs 1 are used. However, LEDs emitting the same color may be used.

The light-shielding body 2 is spaced a predetermined distance from a light-emitting side of the plurality of LEDs 1, and each aperture 21 of the light-shielding body 2 is disposed on an optical axis of each LED 1. In other words, the apertures 21 are arranged to form a rough square as viewed in a direction perpendicular to a leading end surface of the remote controller 200. As will be described later, when the marker unit M faces the TV screen, light emitted from the four LEDs 1 is photographed by the camera 11. When the remote controller 200 is inclined with respect to the TV screen at a predetermined angle, the number of LEDs 1 captured by the camera 11 and positions of the LEDs 1 vary according to the direction of the inclination.

The camera 11 is disposed on the center of an upper bezel of the TV 100, and performs photography in a direction perpendicular to the screen of the TV 100. In other words, the camera 11 has a predetermined photography range as a solid angle, and only light incident upon the camera 11 from among light traveling in the direction perpendicular to the TV screen is photographed.

The computing apparatus E is a computer including a CPU, memory, an input/output device, an A/D converter, a D/A converter, and the like. Thus, a program for image display systems 300 stored in the memory is executed via a cooperation among the included devices, and thus the computing apparatus E is configured to perform the functions of a pointing angle calculator 15 and a coordinate calculator 16 both for estimating a pointing position, a remote control posture estimator 6, and a calibrator 7.

First, each unit associated with calculation of a basic pointing position will be described.

The pointing position estimator 4 calculates a pointing position (coordinate) on the TV screen according to the reference posture of the remote controller 200 and a posture variation of the remote controller 200 measured by the magnetic sensor 31, the acceleration sensor 32, and the angular velocity sensor 33. The pointing position estimator 4 includes the pointing angle calculator 15 that calculates a pointing angle θ which is a pitch angle and a yawing angle formed by the pointing direction PL with respect to a reference pointing direction BPL, which is a pointing direction PL when the remote controller 200 has the reference posture, and the coordinate calculator 16 that calculates a pointing point at which a current pointing direction PL and the TV screen intersect, according to the pointing angle θ calculated by the pointing angle calculator 15.

Figure 29:
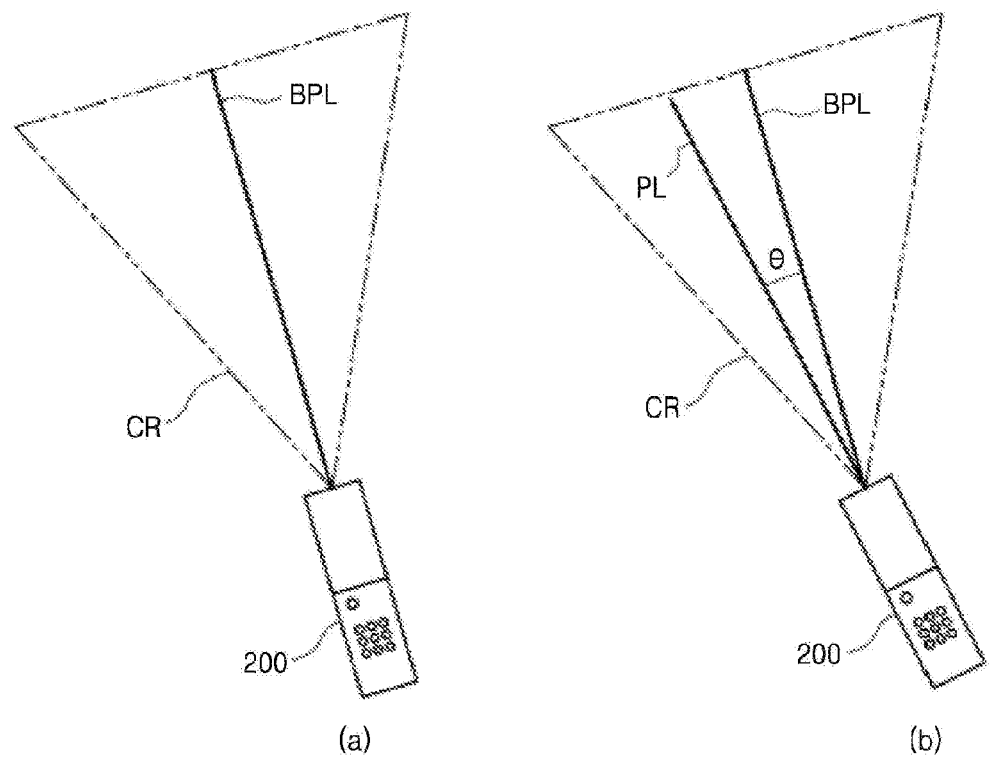
FIG. 29 is a schematic diagram illustrating a relationship between a reference posture and a manipulation angle in the fifth embodiment of the present invention.

The calculation of the pointing angle θ in the pointing angle calculator 15 will now be described in detail. As shown in FIG. 29A, a manipulating angle range CR, in which an angle change is received as a manipulation input by a solid angle having as its center the reference pointing direction BPL corresponding to the case where the remote controller 200, is in the reference posture is previously set in the remote controller 200. For example, when the remote controller 200 directly faces the TV screen and the reference pointing direction BPL faces the center of the TV screen, the manipulating angle range CR is set based on an angle at which the pointing direction PL points around the bezel of the TV 100 by changing a yawing angle or a pitch angle from the reference posture.

For example, the reference posture shown in FIG. 29A is calibrated into 9 types of reference postures according to the pointing direction PL of the remote controller 200 by the standard direction adjuster 7, which will be described later.

As shown in FIG. 29B, the pointing angle calculator 15 calculates an angle formed by the current pointing direction PL with respect to the reference pointing direction BPL within the manipulating angle range CR. In detail, the pointing angle calculator 15 sequentially calculates the pointing angle θ, which is made by the current pointing direction PL and the reference pointing direction BPL by accumulatively integrating a corrected angular velocity obtained from the reference posture by the posture variation measurer 30.

The coordinate calculator 16 calculates a coordinate of a point estimated to be pointed on the TV screen by the current pointing direction PL, according to a reference point estimated to be pointed on the TV screen by the reference pointing direction BPL and the current pointing angle θ.

Figure 28:
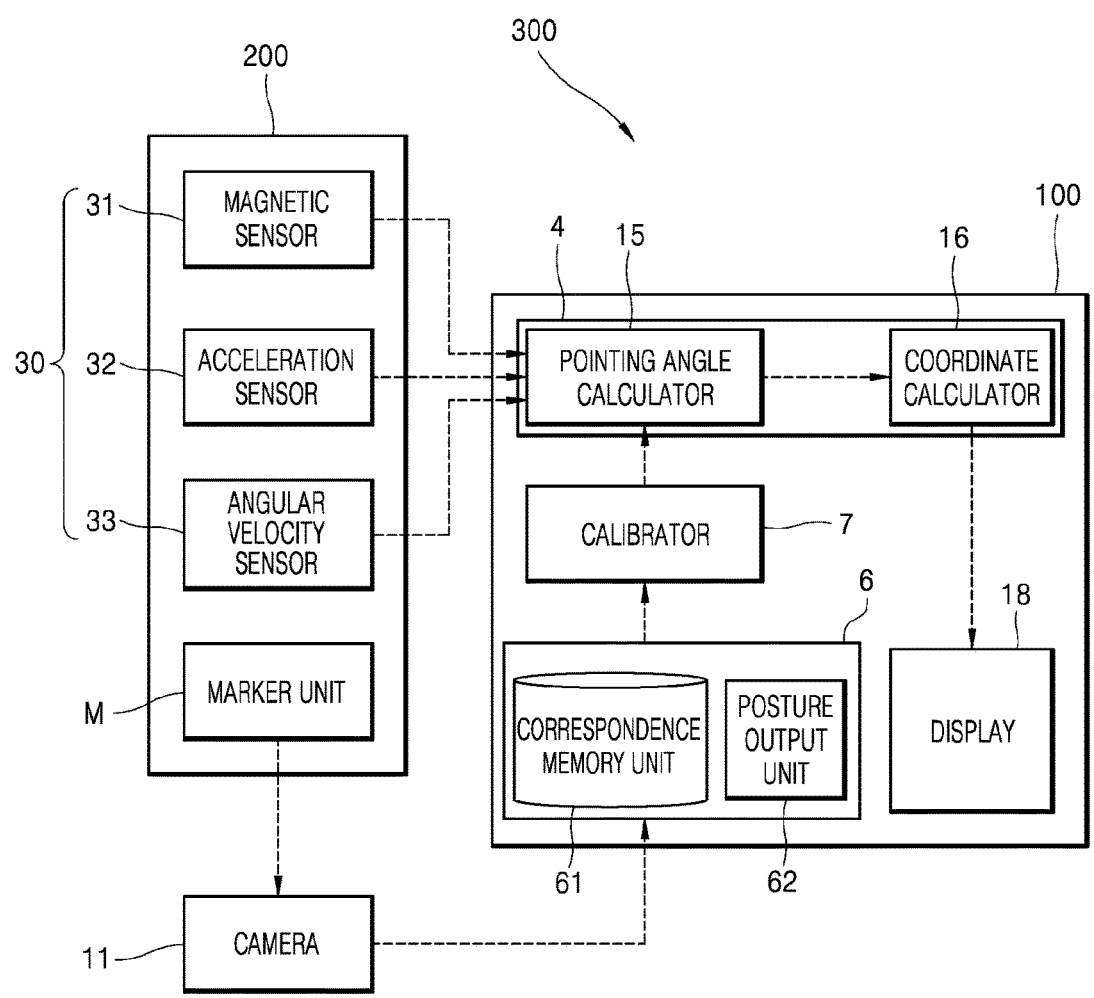
FIG. 28 is a block diagram of functional structures of an image display apparatus and a remote controller that constitute the image display system according to the fifth embodiment of the present invention.

The display 18 of FIG. 28 moves and displays a cursor to the coordinate of the pointing position on the TV screen, which is calculated by the coordinate calculator 16.

Each component associated with calibration of a reference posture serving as a basis for estimating the pointing position will now be described with reference to FIGS. 28 and 30.

The remote control posture estimator 6 estimates a posture of the remote controller 200 corresponding to when the camera 11 performs photography, from an image captured by the camera 11 according to the number of LEDs 1 or positions of the LEDs 1. In more detail, the remote control posture estimator 6 determines an area A pointed by the pointing direction PL of the remote controller 200 from among 9 square areas A provided on the center of the TV screen, and estimates a necessary posture to point at the area A. As shown in FIG. 27 and the like, the 9 areas A are 3 areas in a vertical direction and 3 areas in a horizontal direction that form a square shape. Numbers respectively given to the areas A of FIG. 27 correspond to numbers appearing in the description below and in the drawings. As shown in FIG. 30, the number of LEDs 1 and the positions of the LEDs 1, which are shown on an image captured by the camera 11 when the pointing direction PL of the remote controller 200 points each area A, are unique to each area A. Such a unique relationship between an area A being pointed and the number and positions of LEDs 1 may be established by the structure of the marker unit M. This will be described later in detail.

The remote control posture estimator 6 includes a correspondence memory unit 61 that stores a correspondence relationship between the number and positions of the LEDs 1 on an image captured by the camera 11 and a posture of the remote controller 200 when the image is captured, and a posture output unit 62 that outputs a posture of the remote controller 200 corresponding to the number and positions of the LEDs 1 on the image captured by the camera 11 by referring to the correspondence memory unit 61.

Figure 30:
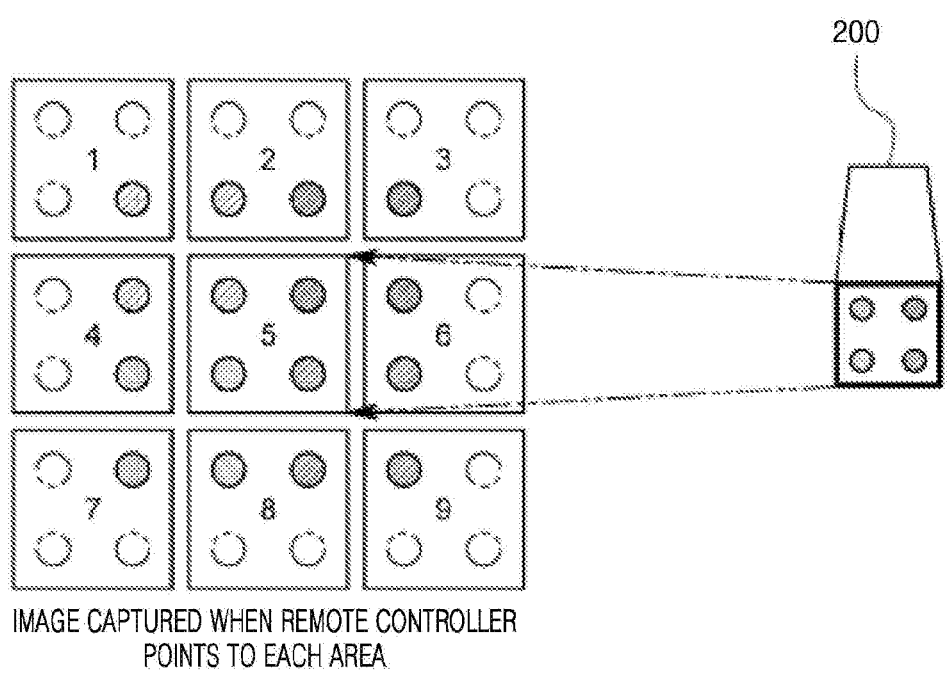
FIG. 30 is a schematic diagram illustrating a relationship between the number of light-emitting diodes (LEDs) photographed when a remote controller points each area and positions of the LEDs, in the fifth embodiment of the present invention.

The correspondence memory unit 61 stores, as a reference image, an area A of FIG. 30 pointed by the remote controller 200, and stores, as a reference image, an image captured when the area A is pointed. When each reference image has been captured, the correspondence memory unit 61 also stores a posture of the remote controller 200 in connection with each reference image. For example, when the remote controller 200 points a fifth area A on the center of the TV screen, since the remote controller 200 directly faces the TV screen, the correspondence memory unit 61 stores a pitch angle and a yawing angle as zero in relation to an image when the fifth area A is pointed. The correspondence memory unit 61 also stores a pitch angle as a predetermined value and a yawing angle as zero in relation to images when the remote controller 200 points second and eighth areas A, respectively, and also stores a pitch angle as zero and a yawing angle as a predetermined value in relation to images when the remote controller 200 points fourth and sixth areas A, respectively. The correspondence memory unit 61 also stores respective unique pitch angles and respective unique yawing angles of respective reference images of first, third, seventh, and ninth areas A, as postures of the remote controller 200.

The posture output unit 62 acquires a reference image of which the number of LEDs 1 and the positions and pattern of the LEDs 1 match with those of a captured image, from the correspondence memory unit 61, and outputs a posture related with the acquired reference image as the posture of the remote controller 200 corresponding to when the camera 11 performs photography. For example, when none of the reference images stored in the correspondence memory unit 61 perfectly matches with a currently captured image, a posture related with a most similar reference image may be used as the posture of the remote controller 200 corresponding to when the camera 11 performs photography. By correcting a related posture according to the positions of the LEDs 1 on the reference images and the positions of the currently-being photographed LEDs, a result of the correction may be used as the posture of the remote controller 200 corresponding to when the camera 11 performs photography.

The calibrator 7 calibrates the reference posture to the posture during photography estimated by the remote control posture estimator 6. The calibrator 7 performs the calibration at regular intervals.

The reason why the number of LEDs 1 and the positions of the LEDs 1 on an image captured when each area A is pointed are unique to the image due to the use of the marker unit M will now be described. FIG. 30 shows a picture captured when each area A is actually pointed in the image display system 300 according to the present invention. Hereinafter, an LED 1 disposed on a left upper portion of a leading end surface of the remote controller 200 as viewed from the TV 100 is referred to as an LED (green), an LED 1 disposed on a right upper portion of the leading end surface of the remote controller 200 as viewed from the TV 100 is referred to as an LED (white), an LED 1 disposed on a left lower portion of the leading end surface of the remote controller 200 as viewed from the TV 100 is referred to as an LED (red), and an LED 1 disposed on a right lower portion of the leading end surface of the remote controller 200 as viewed from the TV 100 is referred to as an LED (blue).

Figure 31:
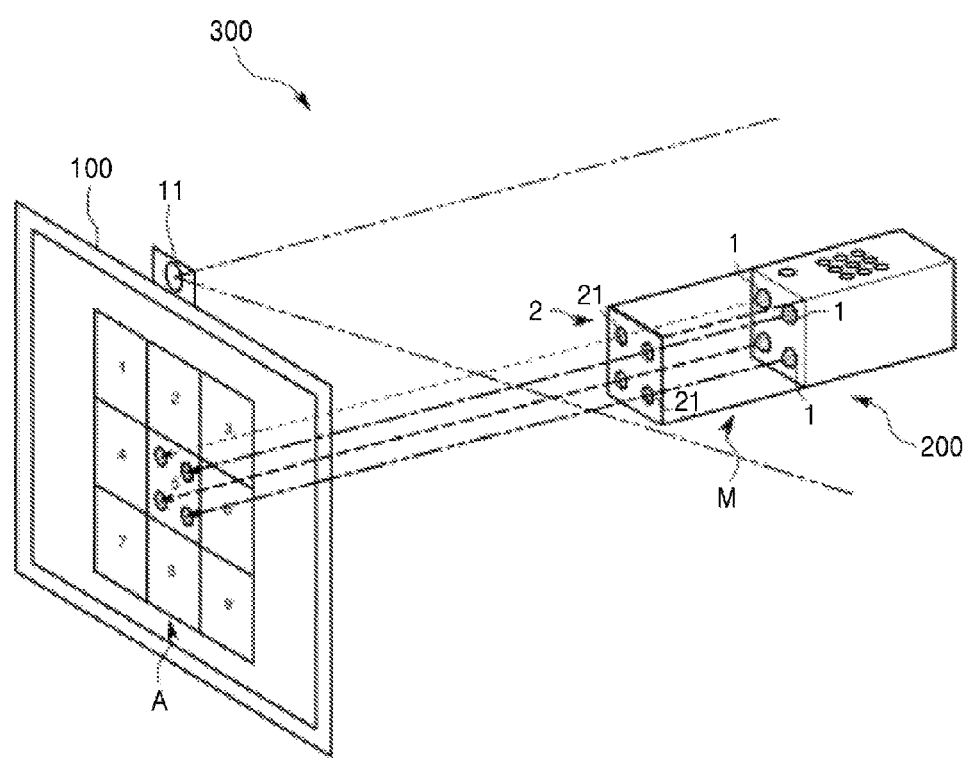
FIG. 31 is a schematic perspective view illustrating LEDs photographed when the remote controller directly faces the screen of the image display apparatus in the fifth embodiment of the present invention.

First, a case where the remote controller 200 directly faces the TV screen and points the fifth area A located on the center will be described with reference to FIG. 31. In this case, since light emitted from each color LED 1 passes through an aperture 21 on the optical axis of the each LED 1, all of the four colors are captured by the camera 11.

Figure 32:
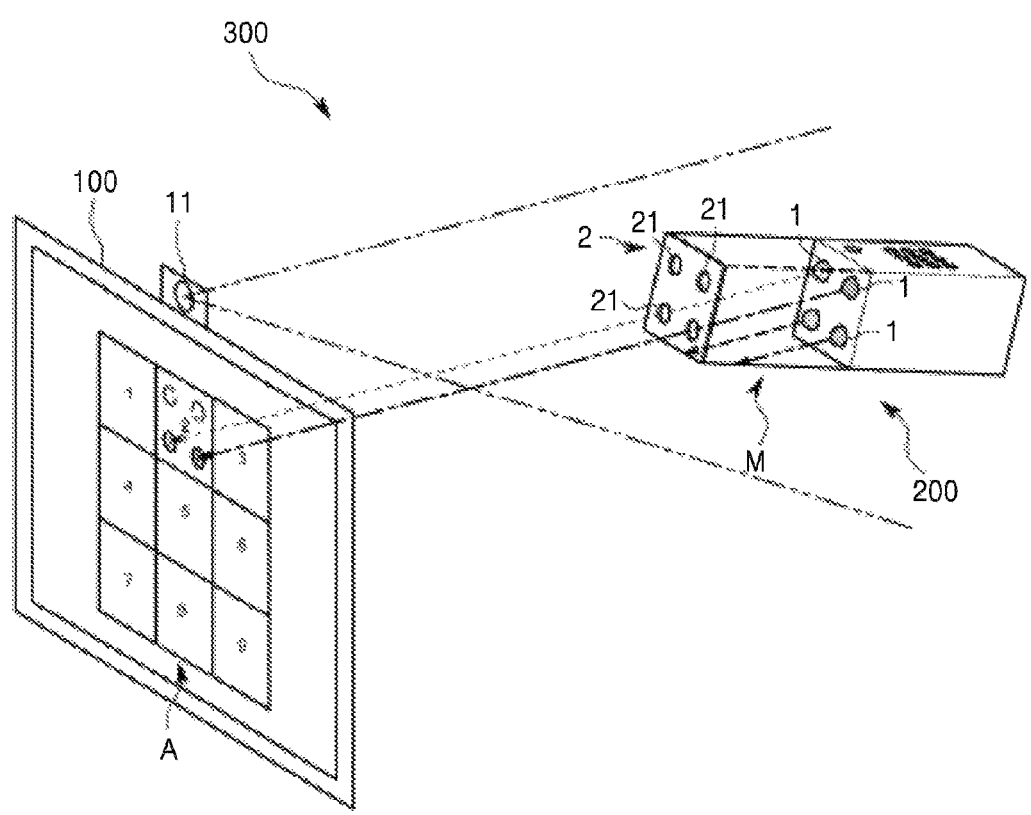
FIG. 32 is a schematic perspective view illustrating LEDs photographed when the remote controller rotates upwards in a horizontal axis direction with respect to the screen of the image display apparatus in the fifth embodiment of the present invention.

Then, a case where the remote controller 200 points the second area A by changing the pitch angle upwards from the state where the remote controller 200 points the fifth area A will be described with reference to FIG. 32. In this case, since the remote controller 200 is tilt, light emitted from the LED (green) on the left upper portion from among the four LEDs 1 reaches the second area A via an aperture 21 on the optical axis of the LED (white) on the left lower portion, and light emitted from the LED (white) on the right upper portion from among the four LEDs 1 reaches the second area A via an aperture 21 on the optical axis of the LED (blue) on the right lower portion. Even when light beams emitted by the LED (red) and the LED (blue) on the left lower portion and the right lower portion pass through any aperture 21, the light beams fail to read the second area A and are both shielded by the light-shielding body 2. Thus, as shown in FIGS. 30 and 31, only 2 LEDs 1 are photographed and shown on the left side of an image. A phenomenon occurring when the second area A is pointed also occurs for the fourth, sixth, and eighth areas A located on the left, right and lower sides of the fifth area A, and the common phenomenon is that only two LEDs 1 are photographed. In more detail, since two LEDs 1 are photographed on the lower portion of an image for the second area A, two LEDs 1 are photographed on the right portion of an image for the fourth area A, two LEDs 1 are photographed on the left portion of an image for the sixth area A, and two LEDs 1 are photographed on the upper portion of an image for the eighth area A, cases where the areas A on the upper, lower, right, and left sides of the fifth area A are respectively pointed by the remote controller 200 may be distinguished from one another.

Figure 33:
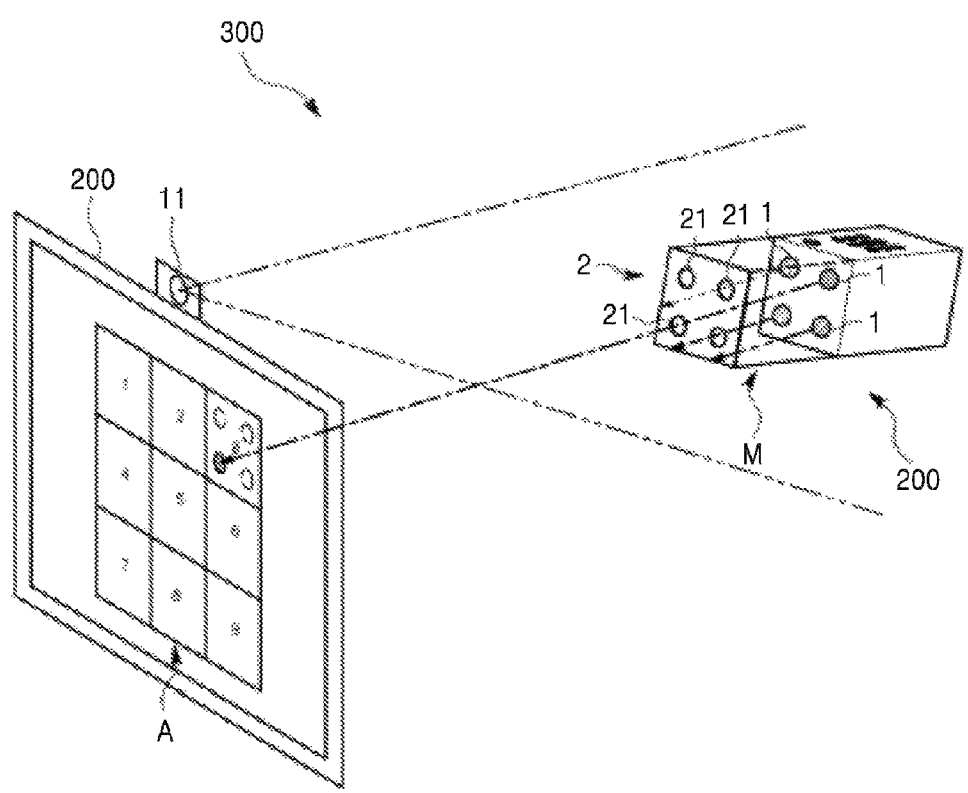
FIG. 33 is a schematic perspective view illustrating LEDs photographed when the remote controller rotates upwards in the horizontal axis direction with respect to the screen of the image display apparatus and also rotates counterclockwise in a vertical axis direction, in the fifth embodiment of the present invention.

Then, a case where the remote controller 200 points the third area A by changing the pitch angle upwards and further changing the yawing angle counterclockwise from the state where the remote controller 200 points the fifth area A will be described with reference to FIG. 33. In this case, as shown in FIG. 33, the LED (white) located on the right upper portion from among the four LEDs 1 may reach the third area A via an aperture 21 on the optical axis of the LED (red) located on a diagonal line from the LED (white). Even when light beams emitted by the other three LEDs 1 pass through any aperture 21, the light beams fail to read the third area A and are shielded by the light-shielding body 3. Thus, as shown in FIGS. 30 and 31, only one LED 1 is photographed and shown on the left lower side of an image. A phenomenon occurring when the third area A is pointed also occurs for the first, seventh, and ninth areas A, and the common phenomenon is that only one LED 1 is photographed. In more detail, since one LED 1 is photographed on the right lower portion of an image for the first area A, one LED 1 is photographed on the left lower portion of an image for the third area A, one LED 1 is photographed on the right upper portion of an image for the seventh area A, and one LED 1 is photographed on the left upper portion of an image for the ninth area A, cases where the first, third, seventh, and ninth areas A are respectively pointed by the remote controller 200 may be distinguished from one another.

As such, due to the marker unit M according to the present invention, since the number of LEDs 1 and the positions of the LEDs 1 on an image captured when each area A is pointed by the remote controller 200 are unique to the pointed area A, the remote control posture estimator 6 may estimate a posture of the remote controller 200 during the capturing according to the captured image.

In other words, since an absolute posture of the current remote controller 200 may be estimated according to an image due to pattern determination, even when a user does not move the remote controller 200 to a designated posture, the reference posture serving as a basis for estimating the pointing position according to the estimated posture of the remote controller 200 during the capturing may be calibrated.

Thus, the image display system 300 according to the present embodiment does not require a calibration initiating operation by a user and thus automatically and regularly calibrate the reference posture. Accordingly, a point pointed by the pointing direction PL of the remote controller 200 while the remote controller 200 is being used, and an estimated point may be prevented from greatly differing from each other, whereby the two points may be maintained to continuously almost match each other.

Moreover, since a posture of the remote controller 200 when the remote controller 200 is photographed is estimated via pattern matching according to the number and positions of LEDs 1 on an image as described above, a calculation load may be decreased, and also the precision of posture estimation may be increased.

Other embodiments will now be described.

Although the above-described embodiments illustrate a pointing device using a TV and a remote controller, the present invention may be equally applied to the other relative pointing type pointing devices using a projector or a PC.

Although a camera is provided on a TV and a marker apparatus is provided on a remote controller in the above-described embodiments, a camera may be provided on a remote controller and a marker apparatus may be provided on a TV. The number of light sources included in a marker apparatus is not limited to 4, and any number of light sources may be used. In other words, the number and positions of light sources on an image captured by a camera may be set to be unique according to a pointing direction of the remote controller.

According to the above-described embodiments, a remote controller is calibrated to different reference postures according to different areas currently pointed by the remote controller. For example, a manipulation range may also be appropriately changed according to an area currently pointed by the remote controller.

Figure 34:
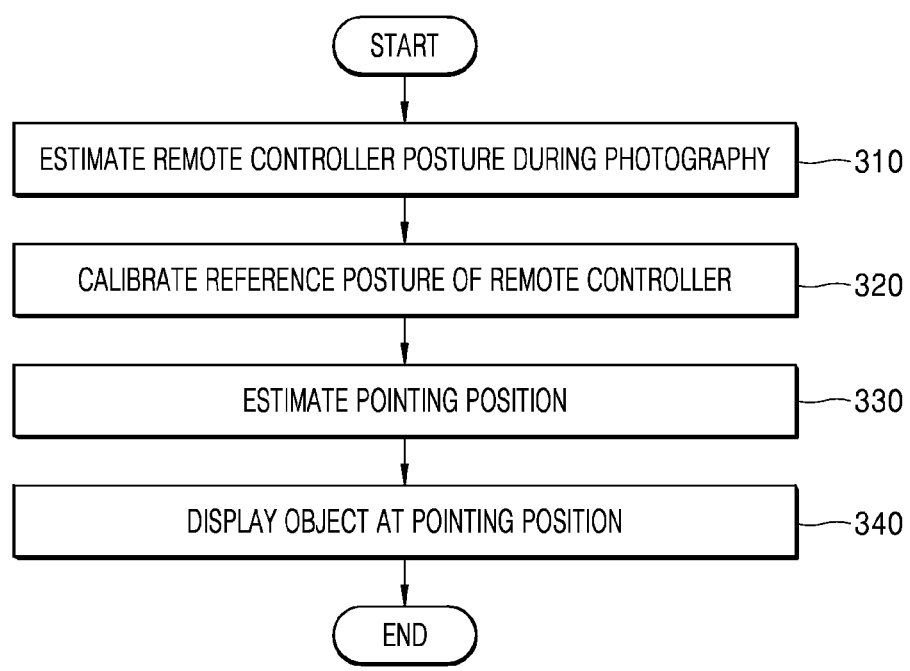
FIG. 34 is a flowchart of a pointing method performed by an image display apparatus according to a sixth embodiment of the present invention.
Figure 35:
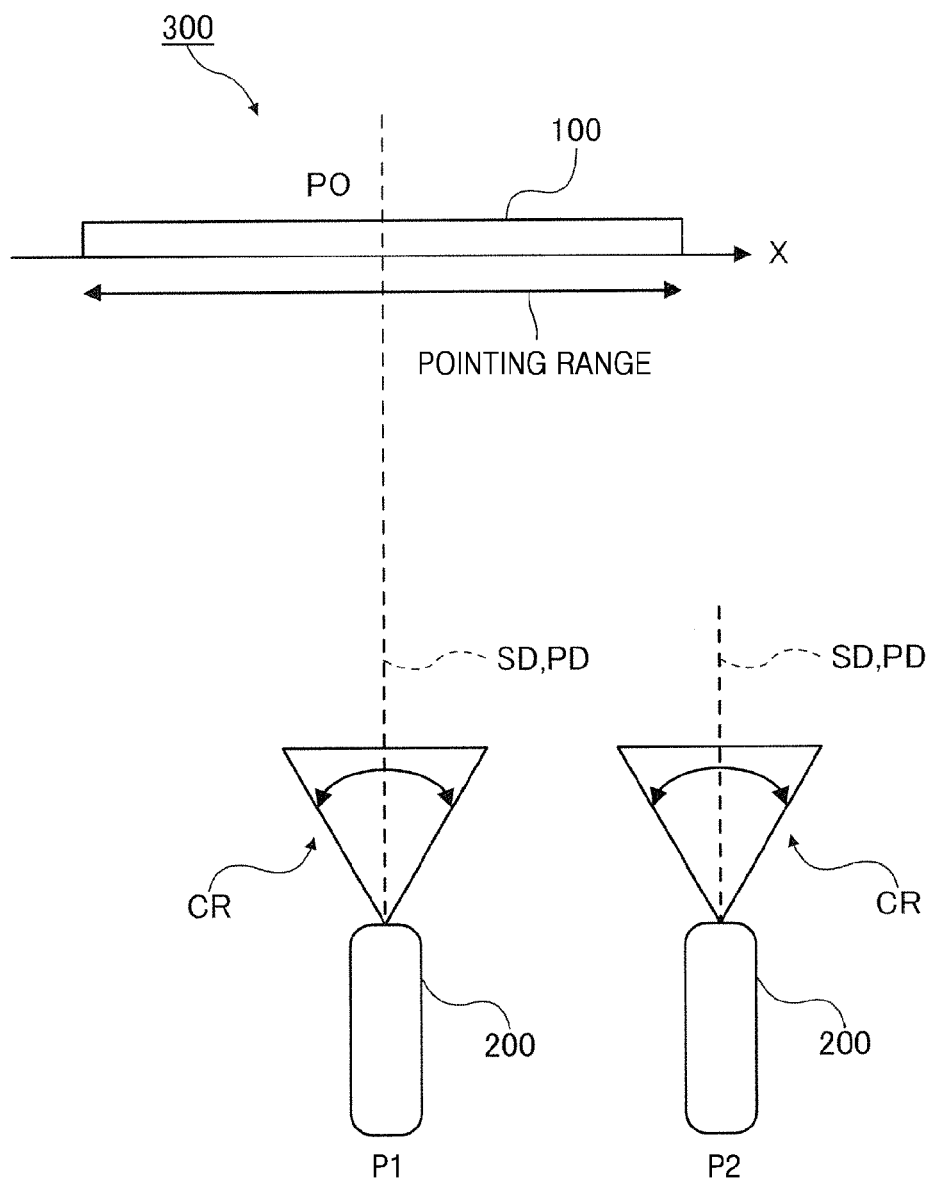
FIG. 35 is a schematic diagram illustrating a pointing operation of a conventional image display apparatus.

FIG. 34 is a flowchart of a pointing method performed by the image display apparatus 100 according to the fifth embodiment of the present invention.

In operation 310, the image display apparatus 100 estimates a remote controller posture during photography corresponding to a direction in which the remote controller 200 is photographed, according to the number or positions of light sources included in the photographed remote controller 200.

In operation 320, the image display apparatus 100 calibrates a reference posture of the remote controller 200 corresponding to a standard direction of the remote controller 200 to the estimated posture of the remote controller 200.

In operation 330, the image display apparatus 100 estimates a pointing position according to the calibrated reference posture and a posture variation measured by the motion sensors provided in the remote controller 200.

In operation 340, the image display apparatus 100 displays an object at the pointing position on a pointing target according to the estimated pointing position.

As such, in the image display apparatus according to the fifth embodiment, the posture of the remote controller when the remote controller is photographed is estimated according to the number and positions of light sources on an image captured by the camera 11, and a reference posture of the remote controller serving as a basis for estimating the pointing position is calibrated according to the estimated posture of the remote controller when the remote controller is photographed. Consequently, all calibration operations may be automated. In other words, a user may neither need to keep the remote controller in a reference posture before calibration nor to perform a particular operation as a trigger for appropriately initiating calibration. In addition, since the image display apparatus according to the fifth embodiment periodically calibrates the reference posture, a position pointed by the pointing direction of the remote controller may be prevented from being greatly different from the estimated pointing point. Thus, even when the image display apparatus according to the fifth embodiment operates based on a relative pointing method, the image display apparatus according to the fifth embodiment may actually and continuously make the position pointed by the pointing direction of the remote controller match the estimated pointing point.

Other embodiments will now be described.

In each of the above-described embodiments, a pointing device is disposed between a TV and a remote controller. However, for example, the pointing device may be disposed between a display and a remote controller. The display may be formed of a projector or the like and may display a pointer on a transparent screen of the display.

The remote control direction detector (an apparatus comprised of a camera, a first remote control detector, and a second remote control detector in the fourth embodiment) may be any apparatus other than a combination of a camera and an LED marker. For example, a sound wave or radio wave generation source may be provided on both ends of a display to detect a relative position of a remote controller with respect to a display by using a triangulation method and to calculate the remote control direction angle.

For example, a method of using ultrasound waves may be used. By including an ultrasonic transmitter in a remote controller and two ultrasonic receivers at different locations on a TV and sending ultrasonic waves from the ultrasonic transmitter of the remote controller, a remote control direction as viewed from the TV may be measured using a triangulation principle, based on a phase difference between ultrasonic waveforms received from the two ultrasonic receivers and an interval between the two ultrasonic receivers. At least 3 ultrasonic receivers may be included. In this case, precise measurement is possible.

Alternatively, a method of using radio waves may be used. Similar to the case of using ultrasonic waves, by including a radio wave transmitter in a remote controller and two radio wave receivers at different locations on a TV and sending radio waves from the remote controller, a remote control direction as viewed from the TV may be measured using a triangulation principle, based on a phase difference between radio waves received from the two radio wave receivers. At least 3 radio wave receivers may be included. In this case, precise measurement is possible.

Similarly, the reference angle detector is not limited to a reference angle detector using a direction sensor. For example, radio waves or sound waves may detect three-dimensional (3D) positions of a leading end and a rear end of a remote controller and may measure the pointing direction of the remote controller from the coordinates of the two 3D positions.

In each of the above-described embodiments, a currently-used pointing angle is replaced by a reference pointing angle so that a standard direction faces a screen center. However, the standard direction may be controlled using a calculation method other than the replacement, such as coordinate transformation. For example, the standard direction may be controlled based on the standard direction and the reference angle.

In the above-described embodiments, a screen center is set as a reference point. However, for example, a point other than the screen center on a display may be set as the reference point.

While the present invention has been particularly shown and described with reference to exemplary embodiments thereof, it will be understood that various changes in form and details may be made therein without departing from the spirit and scope of the following claims.

The present invention relates to an image display apparatus that controls a pointer to be displayed on a display, and thus is applicable to TV systems.

The invention claimed is:

1. An image display apparatus comprising:
   a reference angle detector configured to detect a reference angle formed by a pointing direction of a remote controller with respect to a reference direction set for a display;
   a remote control direction detector configured to detect a remote control direction which is a direction in which the remote controller is viewed, from a reference point set on the display;
   a standard direction adjuster configured to adjust a standard direction set in the remote controller so that the standard direction reaches the reference point set on the display as viewed from the remote controller, based on the reference angle and the remote control direction; and
   a controller configured to control a pointer to be displayed at a corresponding position on the display, based on a pointing angle that is formed by the pointing direction of the remote controller with respect to the standard direction.

2. The image display apparatus of claim 1, wherein the reference angle detector comprises a reference angle calculator configured to calculate the reference angle based on a reference direction set as a direction value output by a direction sensor provided in the remote controller when the pointing direction of the remote controller is perpendicular to the display and based on a remote control direction set as a direction value output by the direction sensor in correspondence with the pointing direction of the remote controller.

3. The image display apparatus of claim 1, further comprising a pointing angle calculator configured to calculate the pointing angle based on a reference pointing angle and an angular velocity output by an angular velocity sensor provided in the remote controller,
   wherein the standard direction adjuster sets an angle formed by the pointing direction with respect to the standard direction, as the reference pointing angle, in the pointing angle calculator.

4. The image display apparatus of claim 3, wherein the pointing angle calculator stores a previous remote control direction corresponding to when the standard direction was adjusted in the past, and calculates the pointing angle when a difference between the previous remote control direction and a current remote control direction is equal to or greater than a threshold value.

5. The image display apparatus of claim 1, wherein the remote control direction detector comprises:
   a camera disposed on the display to be able to photograph the remote controller; and
   a remote control direction angle calculator configured to calculate a remote control direction angle formed by the remote control direction with respect to a direction perpendicular to the display, based on an image captured by the camera.

6. The image display apparatus of claim 5, wherein
   the camera is disposed on a horizontal edge of the display to have a photographing direction parallel to a vertical plane perpendicular to the display,
   the remote control direction angle calculator comprises:
   a first remote control detector configured to calculate a first remote control direction angle made by the direction perpendicular to the display and a direction obtained by projecting the remote control direction to a horizontal plane, based on the image captured by the camera; and
   a second remote control detector configured to calculate a second remote control direction angle made by the direction perpendicular to the display and a direction obtained by projecting the remote control direction to the vertical plane, based on the image captured by the camera, a photographing angle made by the display and the photographing direction, a distance from the camera to the remote controller, and a length of a vertical edge of the display, and
   the standard direction adjuster adjusts the standard direction so that the standard direction reaches the reference point on the display as viewed from the remote controller, based on the reference angle, the first remote control direction angle, and the second remote control direction angle.

7. The image display apparatus of claim 1, wherein
   the controller comprises:
   a position calculator configured to calculate a corresponding position on the display, based on the pointing angle; and
   a display controller configured to control the pointer to be displayed on the corresponding position, and the position calculator calculates the corresponding position so that a distance from the reference point to the corresponding position for each unit angle of the pointing angle increases with an increase in a distance from the display to the remote controller.

8. A pointing method comprising:
detecting a reference angle formed by a pointing direction of a remote controller with respect to a reference direction set for a display;
detecting a remote control direction which is a direction in which the remote controller is viewed, from a reference point set on the display;
adjusting a standard direction set in the remote controller so that the standard direction reaches the reference point set on the display as viewed from the remote controller, based on the reference angle and the remote control direction; and
controlling a pointer to be displayed at a corresponding position on the display, based on a pointing angle that is formed by the pointing direction of the remote controller with respect to the standard direction.

9. The pointing method of claim 8, wherein the detecting of the reference angle comprises calculating the reference angle based on a reference direction set as a direction output by a direction sensor provided in the remote controller when the pointing direction of the remote controller is perpendicular to the display and based on a remote control direction set as a direction output by the direction sensor in correspondence with the pointing direction of the remote controller.

10. The pointing method of claim 8, further comprising calculating the pointing angle based on a reference pointing angle and an angular velocity output by an angular velocity sensor provided in the remote controller,
wherein an angle formed by the pointing direction with respect to the standard direction is set as the reference pointing angle.

11. The pointing method of claim 8, wherein the detecting of the remote control direction comprises calculating a remote control direction angle formed by the remote control direction with respect to a direction perpendicular to the display, based on an image captured by a camera mounted on the display to be able to photograph the remote controller.

12. The pointing method of claim 11, wherein
the camera is mounted on an edge of the display parallel to one of a horizontal plane and a vertical plane perpendicular to the display, to have a photographing direction parallel to a surface other than one of the horizontal plane and the vertical plane,
the calculating of the remote control direction angle comprises:
calculating a first remote control direction angle made by the direction perpendicular to the display and a direction obtained by projecting the remote control direction to the one plane, based on the image captured by the camera; and
calculating a second remote control direction angle made by the direction perpendicular to the display and a direction obtained by projecting the remote control direction to the other plane, based on the image captured by the camera, a photographing angle made by the display and the photographing direction, a distance from the camera to the remote controller, and a length of an edge of the display that is parallel to the other plane, and
the adjusting of the standard direction comprises adjusting the standard direction so that the standard direction reaches the reference point on the display as viewed from the remote controller, based on the reference angle, the first remote control direction angle, and the second remote control direction angle.

13. The pointing method of claim 8, wherein the adjusting of the standard direction comprises adjusting the standard direction at regular intervals.

14. The pointing method of claim 8, wherein
the controlling comprises:
calculating a corresponding position on the display, based on the pointing angle; and
controlling the pointer to be displayed on the corresponding position, and
the calculating of the corresponding position comprises calculating the corresponding position so that a distance from the reference point to the corresponding position for each unit angle of the pointing angle increases with an increase in a distance from the display to the remote controller.

15. The image display apparatus of claim 1, wherein the remote controller comprising:
a light-emission device having at least one light source;
a direction sensor configured to sense a remote control direction value representing a direction in which the remote controller points;
a manipulator configured to manipulate pointing to the image display apparatus; and
a controller configured to turn on the at least one light source of the light-emission device according to a pointing manipulation of the manipulator, modulate the remote control direction value sensed by the direction sensor into a remote control code, and output the remote control code to the image display apparatus via the light-emission device,
wherein the remote control direction value transmitted to the image display apparatus is used by the image display apparatus to determine a pointing position on a display of the image display apparatus.

16. The image display apparatus of claim 1, wherein the remote controller is configured to:
turning on at least one light source of a light-emission device according to a pointing manipulation input and sensing a remote control direction value representing a direction in which the remote controller points;
transforming the sensed remote control direction value into a remote control code; and
outputting the remote control code to the image display apparatus via the light-emission device,
wherein the remote control direction value transmitted to the image display apparatus is used by the image display apparatus to determine a pointing position on a display of the image display apparatus.

\* \* \* \* \*